(12) United States Patent
Trenkle et al.

(10) Patent No.: US 11,010,794 B2
(45) Date of Patent: May 18, 2021

(54) METHODS FOR VIEWER MODELING AND BIDDING IN AN ONLINE ADVERTISING CAMPAIGN

(71) Applicant: Adobe Inc., San Jose, CA (US)

(72) Inventors: John M. Trenkle, Albany, CA (US); John Hughes, Lafayette, CA (US); Adam Rose, San Pablo, CA (US); Kevin Thakkar, Sunnyvale, CA (US); Jason Lopatecki, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 1571 days.

(21) Appl. No.: 14/295,811

(22) Filed: Jun. 4, 2014

(65) Prior Publication Data

US 2014/0289017 A1    Sep. 25, 2014

Related U.S. Application Data

(63) Continuation-in-part of application No. 14/167,183, filed on Jan. 29, 2014.

(Continued)

(51) Int. Cl.
*G06Q 30/00* (2012.01)
*G06Q 30/02* (2012.01)
*G06Q 10/06* (2012.01)

(52) U.S. Cl.
CPC ....... *G06Q 30/0275* (2013.01); *G06Q 10/067* (2013.01); *G06Q 10/06375* (2013.01); *G06Q 30/0204* (2013.01); *G06Q 30/0242* (2013.01)

(58) Field of Classification Search
CPC ......... G06Q 30/0275; G06Q 10/06375; G06Q 10/067; G06Q 30/0204; G06Q 30/0242

(Continued)

(56) References Cited

U.S. PATENT DOCUMENTS 5,937,392 A    8/1999  Alberts
6,338,043 B1   1/2002  Miller
(Continued)

FOREIGN PATENT DOCUMENTS

WO    WO-2011/056346    5/2011
WO    WO-2015/034838    3/2015

OTHER PUBLICATIONS

Computing The Mind, Oxford University Press, Edelman, 2008, pp. xi-36.*

(Continued)

*Primary Examiner* — Gautam Ubale
*Assistant Examiner* — Michael I Ezewoko
(74) *Attorney, Agent, or Firm* — Keller Jolley Preece

(57) ABSTRACT

Systems and methods are disclosed for employing supervised machine learning methods with activities and attributes of viewers with truth as input, to produce models that are utilized in determining probabilities that an unknown viewer belongs to one or more demographic segment categories. Using these models for processing viewer behavior, over a period of time a database of known categorized viewers is established, each categorized viewer having a probability of belonging to one or more segment categories. These probabilities are then used in bidding for online advertisements in response to impression opportunities offered in online media auctions. The probabilities are also used in predicting on-target impressions and GRPs (Gross Rating Points) in advance of online advertising media campaigns, and pricing those campaigns to advertiser/clients. Strategies are also disclosed for fulfilling a campaign when an available inventory of known categorized viewers is not adequate to fulfill a campaign in a required runtime.

27 Claims, 17 Drawing Sheets

Related U.S. Application Data

(60) Provisional application No. 61/921,032, filed on Dec. 26, 2013, provisional application No. 61/779,231, filed on Mar. 13, 2013.

(58) Field of Classification Search
USPC .................................................. 705/14.71
See application file for complete search history.

(56) References Cited

U.S. PATENT DOCUMENTS

| | | | |
|---|---|---|---|
| 6,560,578 | B2 | 5/2003 | Eldering |
| 7,181,412 | B1 | 2/2007 | Fulgoni et al. |
| 7,260,837 | B2 | 8/2007 | Abraham et al. |
| 7,493,655 | B2 | 2/2009 | Brown |
| 7,835,937 | B1 | 11/2010 | Karlsson et al. |
| 7,835,938 | B1 | 11/2010 | Karlsson |
| 7,930,285 | B2 | 4/2011 | Abraham et al. |
| 8,069,076 | B2 | 11/2011 | Oddo |
| 8,073,807 | B1* | 12/2011 | Srinivasaiah ........... G06Q 30/00 706/45 |
| 8,145,645 | B2 | 3/2012 | Delli Santi et al. |
| 8,175,914 | B1 | 5/2012 | Benson et al. |
| 8,182,346 | B2 | 5/2012 | Herrmann et al. |
| 8,190,475 | B1 | 5/2012 | Merrill |
| 8,341,047 | B1 | 12/2012 | Furney et al. |
| 8,380,562 | B2 | 2/2013 | Toebes et al. |
| 8,412,648 | B2 | 4/2013 | Karypis et al. |
| 8,554,602 | B1 | 10/2013 | Zohar et al. |
| 8,571,930 | B1 | 10/2013 | Galperin |
| 8,650,084 | B2 | 2/2014 | Athey et al. |
| 8,700,543 | B2 | 4/2014 | Glickman |
| 8,719,082 | B1 | 5/2014 | Snyder et al. |
| 8,751,461 | B2 | 6/2014 | Abraham et al. |
| 8,924,993 | B1* | 12/2014 | Niebles Duque .. G06K 9/00744 725/9 |
| 9,087,332 | B2 | 7/2015 | Bagherjeiran et al. |
| 9,135,655 | B2* | 9/2015 | Buchalter .............. G06Q 30/02 |
| 9,715,699 | B1 | 7/2017 | Els et al. |
| 9,727,878 | B2 | 8/2017 | Curd et al. |
| 10,176,484 | B2* | 1/2019 | Dilling ............... G06Q 30/0275 |
| 2003/0074252 | A1 | 4/2003 | Chandler-Pepelnjak et al. |
| 2003/0105677 | A1 | 6/2003 | Skinner |
| 2004/0019518 | A1 | 1/2004 | Abraham et al. |
| 2005/0021395 | A1* | 1/2005 | Luu ........................ G06Q 30/02 705/14.41 |
| 2006/0015294 | A1 | 1/2006 | Yetter et al. |
| 2006/0018516 | A1 | 1/2006 | Masoud et al. |
| 2006/0074749 | A1 | 4/2006 | Kline et al. |
| 2006/0212350 | A1 | 9/2006 | Ellis et al. |
| 2007/0027760 | A1 | 2/2007 | Collins |
| 2007/0067215 | A1* | 3/2007 | Agarwal ............... G06Q 30/02 705/14.69 |
| 2007/0094042 | A1 | 4/2007 | Ramer et al. |
| 2007/0180469 | A1 | 8/2007 | Finley et al. |
| 2007/0208728 | A1* | 9/2007 | Zhang ................... G06F 16/337 |
| 2009/0006145 | A1* | 1/2009 | Duggal ................ G06Q 10/025 705/6 |
| 2009/0024546 | A1 | 1/2009 | Ficcaglia et al. |
| 2009/0119172 | A1 | 5/2009 | Soloff |
| 2009/0150238 | A1 | 6/2009 | Marsh et al. |
| 2009/0216619 | A1 | 8/2009 | Tavernier |
| 2009/0254420 | A1 | 10/2009 | Curd et al. |
| 2010/0138290 | A1 | 6/2010 | Zschocke et al. |
| 2010/0262455 | A1* | 10/2010 | Karlsson ................ G06Q 30/02 705/14.45 |
| 2010/0262464 | A1 | 10/2010 | Monteforte et al. |
| 2010/0262497 | A1* | 10/2010 | Karlsson ................ G06Q 30/02 705/14.71 |
| 2011/0035276 | A1 | 2/2011 | Ghosh et al. |
| 2011/0106633 | A1 | 5/2011 | Cook |
| 2011/0137721 | A1 | 6/2011 | Bansal |
| 2011/0145070 | A1 | 6/2011 | Wolinsky et al. |
| 2011/0213654 | A1 | 9/2011 | Yang |
| 2011/0231242 | A1* | 9/2011 | Dilling .................. G06Q 30/02 705/14.42 |
| 2011/0246310 | A1 | 10/2011 | Buchalter et al. |
| 2012/0004983 | A1 | 1/2012 | Borthwick et al. |
| 2012/0041816 | A1 | 2/2012 | Buchalter |
| 2012/0054021 | A1 | 3/2012 | Kitts et al. |
| 2012/0158456 | A1 | 6/2012 | Wang et al. |
| 2012/0158954 | A1 | 6/2012 | Heffernan et al. |
| 2012/0197816 | A1 | 8/2012 | Short et al. |
| 2012/0203623 | A1 | 8/2012 | Sethi et al. |
| 2012/0239809 | A1 | 9/2012 | Mazumdar et al. |
| 2012/0316957 | A1 | 12/2012 | Zhou et al. |
| 2012/0323674 | A1* | 12/2012 | Simmons ........... G06Q 30/0249 705/14.41 |
| 2013/0103681 | A1 | 4/2013 | Renders et al. |
| 2013/0124308 | A1 | 5/2013 | Hegeman et al. |
| 2014/0236710 | A1 | 8/2014 | Nashed |
| 2014/0278749 | A1 | 9/2014 | Trenkle et al. |
| 2014/0278912 | A1 | 9/2014 | Hughes et al. |
| 2014/0278937 | A1 | 9/2014 | Hughes et al. |
| 2014/0278938 | A1 | 9/2014 | Hughes et al. |
| 2014/0330646 | A1 | 11/2014 | Mierle et al. |
| 2014/0337143 | A1 | 11/2014 | Petersen et al. |
| 2015/0066639 | A1 | 3/2015 | Knapp et al. |
| 2015/0066662 | A1 | 3/2015 | Knapp et al. |
| 2015/0106190 | A1 | 4/2015 | Wang et al. |
| 2015/0186927 | A1 | 7/2015 | Chittilappilly et al. |
| 2016/0063573 | A1 | 3/2016 | Thakkar et al. |

OTHER PUBLICATIONS

Metaphors We Live By, Lakoff, University of Chicago Press, 1980, pp. ix-55.*
Frame Analysis, Goffman, Northeastern University Press, 1974, pp. 1-39, 301-344.*
Predictive Analytics in Information Systems Research (Year: 2011).*
U.S. Appl. No. 13/927,687, dated Jul. 13, 2017, Office Action.
U.S. Appl. No. 14/167,183, dated Jun. 29, 2017, Office Action.
Robotics, Science and Systems III, Wolfram Burgard, Oliver Brock, and Cyril Stachniss, The MIT Press, 2008, pp. 41-48.
Language and Mind, Chomsky, Oxford University Press, 2005, p. 62.
Computing the Mind, Shimon Edelman, Oxford University Press, 2008, pp. 26-31.
Noetics, Lawrence Krader, 2010, Peter Lang Publishing, pp. 551-553.
Britannica Concise Encyclopedia, Encyclopedia Britannica, 2006, p. 537.
"Advances in Expert Systems", Published by InTech; Edited by Petrcia Vizureanu, (Dec. 5, 2012), pp. 101-103.
U.S. Appl. No. 13/927,687, dated Apr. 6, 2015, Office Action.
U.S. Appl. No. 13/927,687, dated Oct. 30, 2015, Office Action.
U.S. Appl. No. 13/927,687, dated Oct. 21, 2016, Office Action.
U.S. Appl. No. 14/143,984, dated Dec. 11, 2015, Office Action.
U.S. Appl. No. 14/143,984, dated Jul. 27, 2016, Office Action.
U.S. Appl. No. 14/144,016, dated Dec. 3, 2015, Office Action.
U.S. Appl. No. 14/144,016, dated Jul. 27, 2016, Office Action.
U.S. Appl. No. 14/167,183, dated Dec. 22, 2016, Office Action.
U.S. Appl. No. 14/143,984, dated Apr. 23, 2018, Notice of Allowance.
U.S. Appl. No. 14/144,016, dated Apr. 20, 2018, Notice of Allowance.
U.S. Appl. No. 14/565,197, dated Apr. 10, 2018, Office Action.
Baum, Eric, "What is Thought", *The Mit Press*, (2004), pp. 33-65.
Microsoft Press, "Microsoft Computer Dictionary", *Fifth Edition*, (2002), p. 23.
Searle, John R., "Mind—A Brief Introduction", *Oxford University Press*, (2004), pp. 62-67.
U.S. Appl. No. 14/143,984, dated Nov. 29, 2017, Office Action.
U.S. Appl. No. 14/144,016, dated Dec. 6, 2017, Office Action.
The Daily You, Yale University Press, Turow, 2011, pp. 1-170 [emphasis pp. 79-85].
The Presentation of Self in Everyday Life, Anchor Books, Goffman, 1959, pp. 17-76.

(56) References Cited

OTHER PUBLICATIONS

YouTube and Video Marketing, John Wiley and Sons, Jarboe, 2012, pp. xv-18, 96, 338-348, 416.
Undoing Gender, Routledge, Butler, 2004, pp. 52-101.
U.S. Appl. No. 14/565,197, dated Dec. 20, 2018, Office Action.
U.S. Appl. No. 14/167,183, dated Nov. 29, 2018, Office Action.
U.S. Appl. No. 15/052,718, dated Nov. 19, 2018, Office Action.
U.S. Appl. No. 14/565,197, dated May 29, 2019, Notice of Allowance.
U.S. Appl. No. 14/167,183, dated Jun. 25, 2019, Office Action.
U.S. Appl. No. 15/052,718, dated May 31, 2019, Office Action.
Nielsen Holdings N.V., "AOL Leverages Nielsen Online Campaign Ratings Measurement to Offer TV-Like GRP Guarantee for Online Video", www.nielsen.com/us/en/insights/press-room/2012/aol-leverages-nielsen-online-campaign-ratings-measurement-to-off.html, (Apr. 16, 2012), 3 pp. total.
Nielsen Holdings N.V., "Nielsen Campaign Ratings Overview", www.nielsen.com/us/en/practices/marketing-effectiveness/nielsen-campaign-ratings/overview.html, (2013), 4 pp. total.
YuMe, "Calculating Online Video GRP for Television Buyers", downloaded from www.YuMe.com, (at least as early as 2010), pp. 1-5.

\* cited by examiner

METHODS FOR VIEWER MODELING AND BIDDING IN AN ONLINE ADVERTISING CAMPAIGN

CROSS-REFERENCE TO RELATED APPLICATIONS

This application is a continuation-in-part of U.S. patent application Ser. No. 14/167,183 filed Jan. 29, 2014, which claims the benefit of U.S. Provisional Patent Application No. 61/779,231 filed Mar. 13, 2013 and U.S. Provisional Patent Application No. 61/921,032 filed Dec. 26, 2013.

BACKGROUND OF THE INVENTION

1. Field of the Invention

The present invention relates generally to systems and methods for characterizing viewer behavior and determining to what degree a specific viewer's behavior places them in a specific category with respect to their behavior. It also relates to systems and methods for rating the success of online advertising campaigns as well as predicting the success of online advertising campaigns and pricing campaigns based on the predictions in advance of a campaign run time. The invention also relates to systems and methods for characterizing websites and viewers with respect to polarized characteristics, and methods for determining probabilities that a viewer belongs to one or more demographic categorization segments, and using those probabilities for determining bids for ad opportunities in a campaign.

2. Prior Art

According to www.wikipedia.Org®, Gross Rating Point (GRP) is a term used in advertising to measure the size of an audience reached by a specific media vehicle or schedule. It is the product of the percentage of the target audience reached by an advertisement, times the frequency they see it in a given campaign (frequency×% reached). For example, a television advertisement that is aired 5 times reaching 50% of the target audience each time it is aired would have a GRP of 250 (5×50%). To achieve a common denominator and compare media, reach×frequency are expressed over time (divided by time) to determine the 'weight' of a media campaign. GRPs are used predominantly as a measure of media with high potential exposures or impressions, like outdoor, broadcast, or online (Internet).

GRP values are commonly used by media buyers to compare the advertising strength of various media vehicles, including in recent years, online advertising on the Internet. All GRP calculations to date are historical, being compiled after a campaign completes. Video ads typically contain a pixel pattern called a "tracking pixel" supported by, for instance, Nielsen®. For example, if a user logs onto Facebook® (a Nielsen media partner) and then visits another website where an ad that Nielsen is tracking is shown, Nielsen will put a pixel in the ad that will prompt Facebook to send Nielsen the age and gender of the people who viewed the ad. Nielsen can then match the IP address of the pixel to see if the person is also on a Nielsen panel. If so, the information from the third-party partner can be combined with the panel demographics. This mechanism enables Nielsen to report on the GRPs delivered on a specific online ad campaign after the campaign has completed.

In the RTB (Real-Time Bidding) environment for electronic media impression auctions, an electronic advertising agency/consolidator operating a demand-side platform receives billions of daily auction opportunities for electronic media impressions from partners like Google®, Yahoo®, etc. These partners operate auctions for ad impressions and then place electronic ads based on auction results. A partner's auction is considered an external auction with respect to a demand-side platform where an internal auction may also be operated to determine which advertisements, also referred to herein as ads, and bids are submitted to the external auction. Each ad impression opportunity includes information parameters about the ad impression—for example, the target website, geolocation of the user, ad size, user cookie, etc, that are used for targeting purposes. The demand side platform then processes hundreds of ads in their system, supplied by advertiser clients along with desired filtering/targeting parameters, against information parameters supplied by the partner, and filters out any ads that do not qualify (for example the ad does not want to target Youtube.com®). For ads that are not removed due to a mismatch with targeting parameters, the demand-side platform then evaluates the corresponding bids that represent how much each client advertiser is willing to pay. The winning bid in the internal auction is then sent to the external auction to compete for the impression opportunity.

An electronic advertising agency/consolidator operating a demand-side platform typically charges their advertiser/clients based on impressions after the fact. They have not previously been known to guarantee the reach of a campaign ahead of time—and do so at a guaranteed price.

Note that in some scenarios, the electronic advertising agency/consolidator operating a demand-side platform and the advertiser/client may in fact be the same entity—for instance when they comprise a large organization with an internal advertising department capable of acting as a demand-side platform. Also, in such an instance, there may be no internal auction—just a submission to an external auction.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 9a describes a campaign addressing polarized viewers. FIG. 9b describes a campaign addressing polarized MPs.

DETAILED DESCRIPTION OF THE PREFERRED EMBODIMENTS

Figure 1:
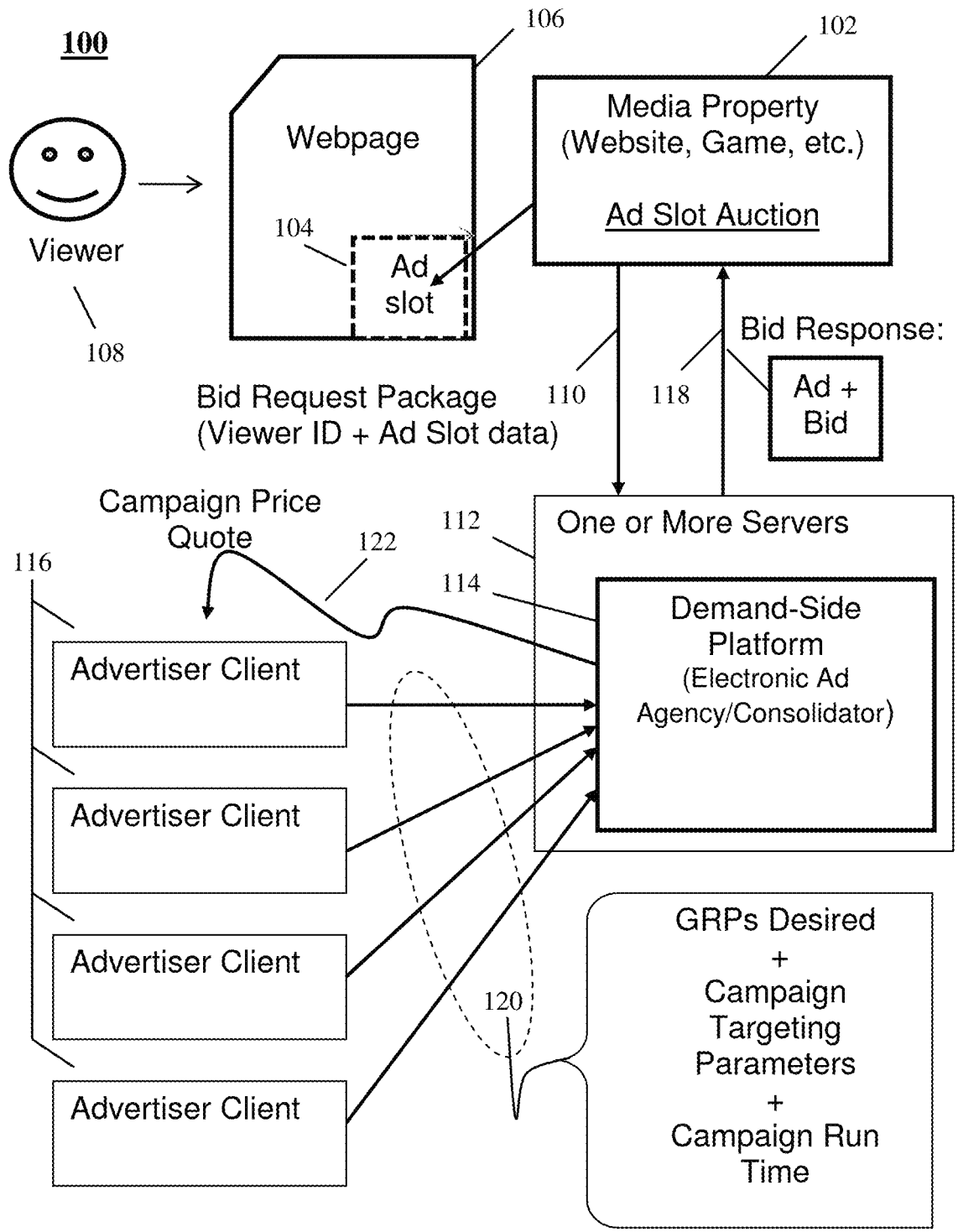
FIG. 1 shows an overview block diagram showing system components and data flow for a demand side platform according to the invention.

Systems and methods are disclosed for characterizing websites and viewers, for predicting GRPs (Gross Rating Points) for online advertising media campaigns, and for pricing media campaigns according to GRPs delivered as opposed to impressions delivered. To predict GRPs for a campaign, systems and methods are disclosed for first characterizing polarized websites and then characterizing polarized viewers. To accomplish this, a truth set of viewers with known characteristics is first established and then compared with historic and current media viewing activity to determine a degree of polarity for different Media Properties (MPs)—typically websites offering ads—with respect to gender and age bias. A broader base of polarized viewers is then characterized for age and gender bias, and their propensity to visit a polarized MP is rated. Based on observed and calculated parameters, a GRP total is then predicted and priced to a client/advertiser for an online ad campaign.

Even if a polarization profile for a specific viewer is not known, it is useful to understand the polarization profile or probability for a website where that viewer is about to be offered an ad impression, and a GRP expectation can be computed for such scenarios as described herein. Further, creating a database of polarized websites that have each been profiled according to their polarization probabilities with respect to certain Viewer Characteristics (VCs) is useful not only in estimating GRPs for a campaign. It is also useful as a component of an exemplary process as described herein for profiling unknown viewers in order to classify them and create a database of polarized viewers.

Profiling Polarization of Media Properties

A key function of the processes described herein is to determine the "polarization" of a Media Property. A Media Property or MP represents a specific instance of a media platform for electronically delivering information to a viewer. An MP as referenced herein usually refers to a website or URL on the Internet, however may also refer for example and without limitation to an App ID, a Game ID, or other electronic media including for example electronic billboards. Polarization in general refers to the extent that a particular MP, or as will later be described, a particular viewer, has characteristics that are biased (or not biased) with respect to certain targeting criteria. Polarization ratings are usually expressed in terms of probability percentages—however other rating methods may be used. Targeting characteristics most commonly utilized for polarity rating are typically age and gender, although other characteristics may be also rated without limitation. Viewer age is typically broken down into age brackets, for example 12-17, 18-34, 35-44, etc. Viewers are commonly identified by their electronic "cookie" passed from their computer to a site they are visiting, and as such a process for classification of viewers according to various viewer characteristics is sometimes known as "cookie bucketing". Note that a particular viewer may in fact use multiple computers and therefore have multiple cookies. While multiple cookies may typically be treated as multiple viewers, it is possible to treat them as the same viewer if sufficient information on a viewer and their computer use is known. For the sake of non-limiting examples presented herein, each cookie is assumed to represent a different viewer and the terms "viewer" and "cookie" are assumed to be synonymous.

FIG. 1 shows an overview block diagram describing system components and data flow for a demand side platform according to the invention with a focus on information conveyed relative to polarization profiling of MPs and viewers, and for estimating and quoting GRPs (Gross Rating Points) to an advertiser client 116 provided by a demand-side platform 114. GRP estimation according to the invention includes first establishing databases of known polarized MPs as well as a database of known polarized viewers as described with respect to FIGS. 2 and 3. Per FIG. 1, an ad slot opportunity 104 on a webpage 106 offered by an exemplary media property 102 is offered in an auction for an impression opportunity. Here, an advertisement is to be placed in ad slot 104 on webpage 106 to be viewed by a specific viewer 108. Media property 102 sends a bid request package 110 consisting of viewer identification information for viewer 108 and criteria specific to ad slot 104. This bid request package is received on one or more servers 112 where the demand-side platform 114 operates, and this information is processed thereon. Subsequently, if the impression opportunity fits the targeting criteria of one or more advertiser clients 116, the demand-side platform will respond with a bid response 118 which includes the advertisement itself as well as a bid price.

This particular impression opportunity may fit with a previously defined advertising campaign for one or more advertiser clients 116. For such campaigns, the demand-side platform 114 may have previously provided a price quote 122 for such campaign. As opposed to simply quoting impressions to be purchased, according to the invention such a campaign may be quoted in terms of GRPs delivered, essentially guaranteeing viewing reach for specific targeting criteria. In order to receive such a campaign price quote 122, an advertiser client 116 would have previously delivered to the demand-side platform a request for a quotation including information package 120. Information package 120 includes for example and without limitation: GRPs desired; campaign targeting parameters; and campaign runtime.

Figure 2:
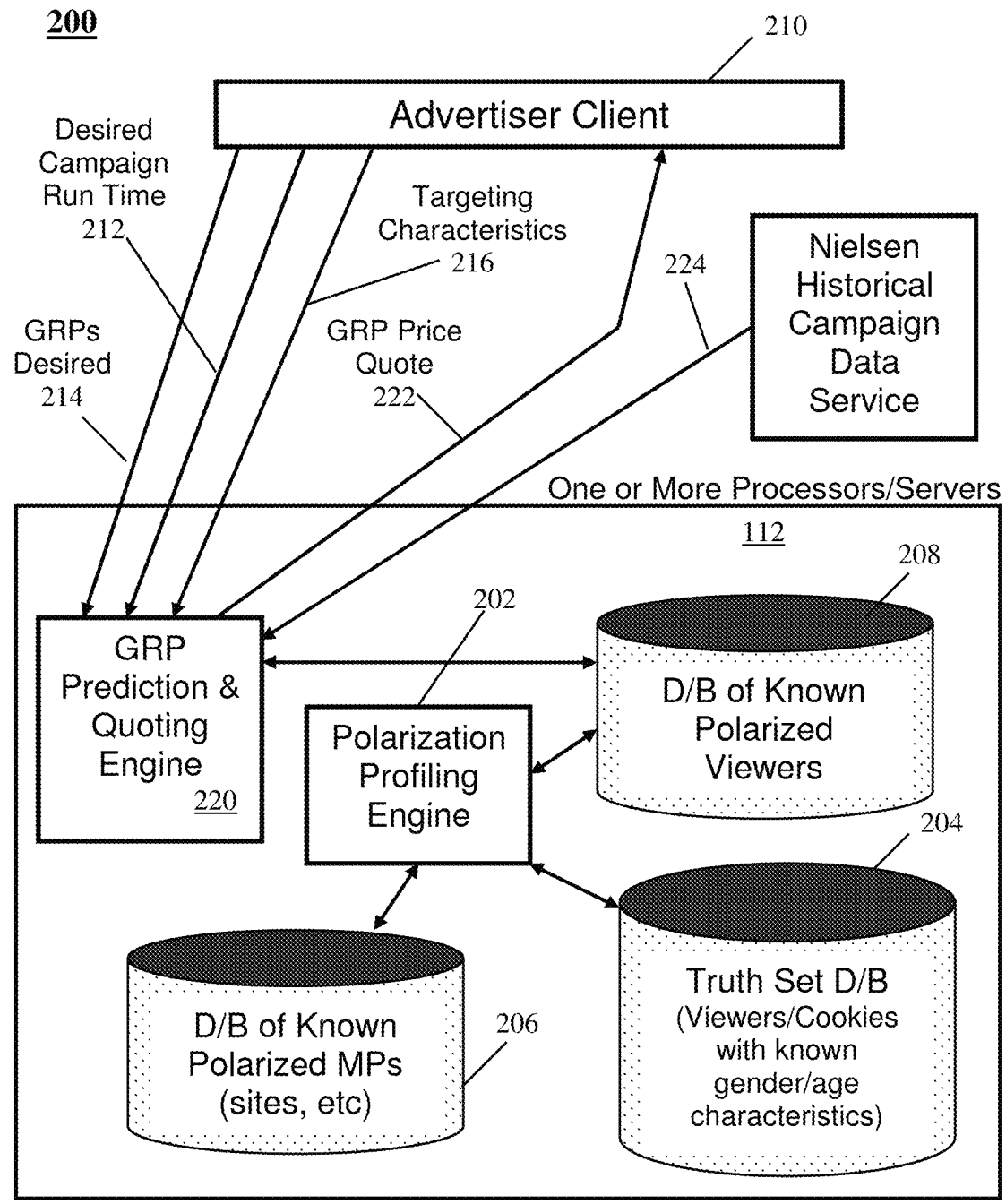
FIG. 2 shows an overview block diagram showing system components and data flow for website and viewer polarization profiling as well as GRP prediction and quoting according to the invention.

FIG. 2 shows an overview block diagram describing system components and data flow for website and viewer polarization profiling as well as GRP prediction and quoting according to the invention. Here, a polarization profiling engine 202 operating on one or more processors/servers 112 operates according to the exemplary flow described in FIG. 3, first creating a database of polarized MPs 206 based on the activity of viewers in truth set 204. Viewers in truth set 204 are characterized at least by gender, however may also be characterized for example and without limitation by age, geographic locations ("geos"), and other characteristics. Subsequently a database of known polarized viewers 208 is created by the polarization profiling engine. Optionally, look-alike viewers may be categorized as described herein and added to the database of known viewers based on comparing with known polarized viewers.

Subsequently, an advertiser client 210 may supply an information package 120 to the demand-side platform including a desired campaign runtime 212, a quantity of GRPs desired 214 for a campaign, and targeting characteristics 216 for the campaign. In response, GRP prediction and quoting engine 220 operating on one or more processors/servers 112 provides a GRP price quote 222 to advertiser client 210. Should the advertiser client find the quote acceptable they will normally proceed to engage with the demand-side platform to execute the campaign. When the campaign is completed, a package of historical campaign data 224 is obtained from Nielsen® in order to validate the reach of the campaign.

Figure 3:
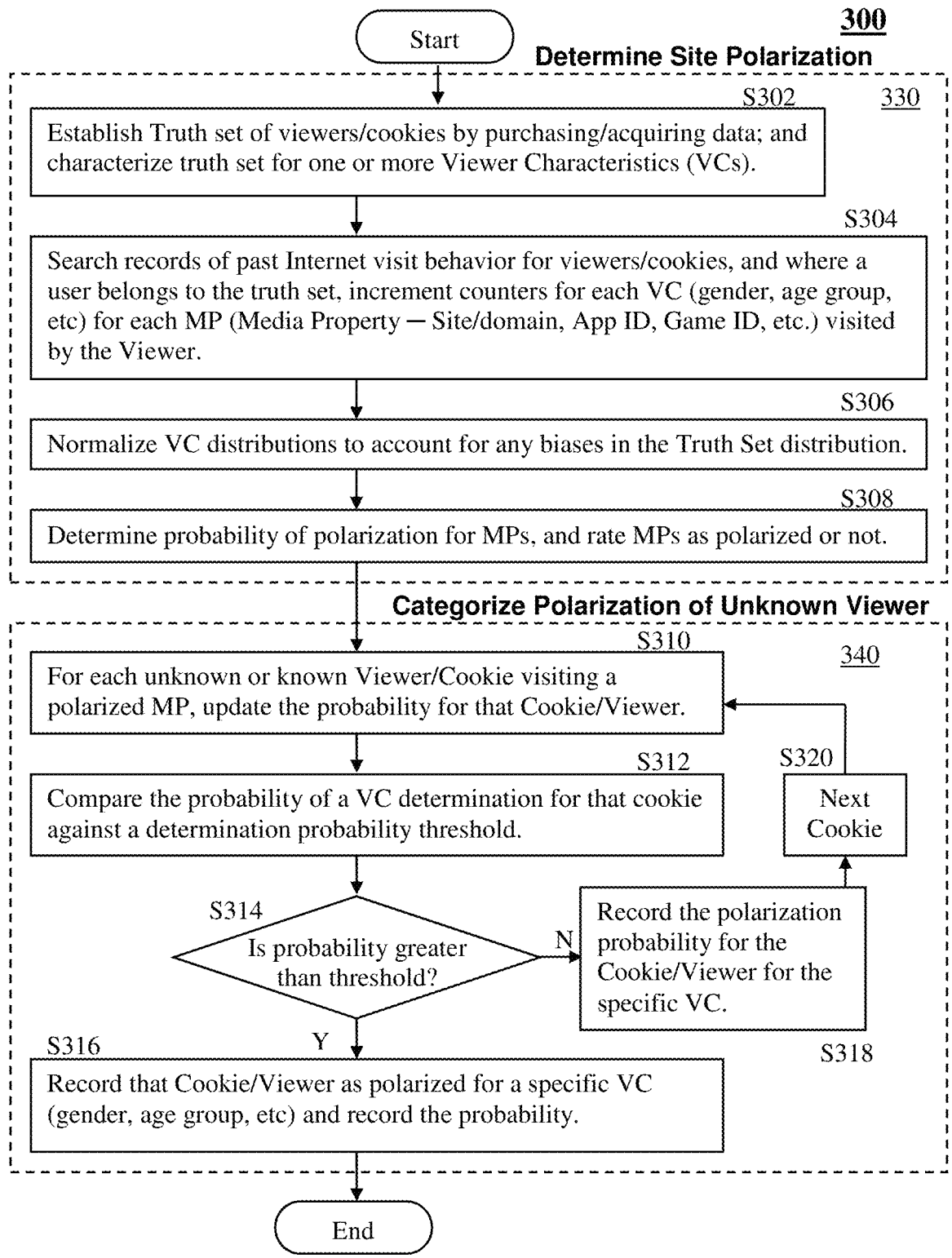
FIG. 3 shows a flowchart with exemplary and non-limiting methods described for the determination of site polarization as well as determination of polarization for unknown viewers in order to classify them as known polarized viewers.

As shown in flowchart 300 of FIG. 3, a first phase of an exemplary and non-limiting polarization characterization process according to the invention involves a determination 330 of polarization characteristics for different MPs (typically websites) that viewers may visit. Within this process, a first step is to establish 302 a "Truth Set" of viewers/cookies by purchasing or otherwise acquiring data. A truth set is a database of specific viewers including their cookies and known characteristics for those viewers such as for example age and gender. Once a truth set is available, it is then characterized for one or more Viewer Characteristics (VCs) per step S302.

Subsequently per step S304, records of past Internet visits are searched and analyzed relative to the behavior of different viewers going back in time by a specified number of months. Where a viewer in the records of past Internet visits belongs to the truth set, counters are incremented for each VC (gender, age group, etc) for each MP (Media Property—Site/domain, App ID, Game ID, etc.) visited by the viewer. Once this process is finished, at least an empirical male/female frequency or probability has been established for every Media Property matched by at least one viewer/cookie from the truth set. In a similar way, each MP is also profiled for polarization with respect to viewers/visitors in different age brackets and any other VC category of interest.

With respect to for instance gender, statistically the gender distribution is expected to be approximately 50:50 in the general Internet populace, and therefore it is appropriate to then normalize 306 distributions for each media property to account for any biases in the Truth Set distribution. In order to accomplish this, the gains to be applied to the Male and Female probabilities are computed as follows:

First, the number of viewers/cookies representing the "Least Frequent Gender" is calculated to be equal to the minimum number of either the (Females in the Truth Set) or the (Males in the Truth Set). Then the gain factor for each gender subset is calculated as follows:

Gain for Females=Least Frequent Gender/Females in Truth Set

Gain for Males=Least Frequent Gender/Males in Truth Set

Then, the Unbiased Probability ("P") for each gender at each media property (MP) is determined S308 as follows:

$P$(Female) for MP=Gain for Females*(Female Count for MP/Total Cookies at MP)

$P$(Male) for MP=Gain for Males*(Male Count for MP/Total Cookies at MP)

At this point, a database of polarized MPs has been created where for each MP, a polarization probability exists for each VC for which a characterization determination was performed with respect to the truth set. One embodiment of GRP prediction and quoting utilizes this polarized MP database to calculate predicted GRP reach for a proposed campaign and to create a price quote for that campaign.

After an initial classification process for polarized websites using the truth set per FIG. 3, MPs may be further "bucketed" or classified each time a viewer in the truth set visits a website, therefore further enhancing the classification accuracy for any MP so visited.

Polarization Profiling of Viewers

In predicting the results of a campaign it can be especially useful if the polarization of a potential viewer is understood when impression opportunities arise on a particular MP for that viewer. As such, it is useful to profile and classify unknown viewers with respect to VCs and build a database of known polarized viewers including a probability of polarization with respect to different VCs for each polarized viewer.

Choosing a set of MPs (media properties) that will allow the profiling of viewers/cookies that are not members of the truth set is done as follows:

Per step 308, all MPs are identified whose unbiased distributions are highly polarized towards Male or Female (or towards any other VCs being analyzed), and these are rated as "polarized". Stereotypical examples of websites (MPs) exhibiting extreme degrees of polarization include for instance: Sports-oriented for Males; and Fashion-oriented for Females.

To accomplish this, a threshold is applied to the dominant gender, that is, if the value of:

$$\text{Max}(P(\text{Female}), P(\text{Male}))$$

is greater than a predefined threshold, for example and without limitation 0.80, then the MP is added to the Polarized Set with respect to the VC being analyzed—for instance in this example, gender. This typically results in 100s to 1000s of media properties being added to a database of polarized MPs, with varying levels of traffic being categorized as "polarized" or not. In all cases, the polarization probability for an MP with respect to each VC is recorded, and this is useful in some embodiments of GRP estimation and quoting when not all sites chosen by an advertiser/client are highly polarized, and some sites with only moderate polarization must be included in order to fulfill the reach and/or time frame requirements of a campaign.

To categorize 340 any unknown viewer/cookie for VC polarization probability, for example gender (Male or Female), an exemplary process according to the invention keeps a running probability for each of them. By default the distribution is set at:

$$P(\text{Female})=0.5 | P(\text{Male})=0.5$$

Each time that a cookie/viewer is seen viewing a polarized MP, the probabilities for that cookie/viewer are updated S310 as follows (with the assumption that each auction is statistically independent):

$$P(\text{Male})'=P(\text{Male})*\text{Polarized Site }P(\text{Male})$$

$$P(\text{Female})'=P(\text{Female})*\text{Polarized Site }P(\text{Female})$$

where the:

$$\text{Denominator for Normalization}=P(\text{Male})'+P(\text{Female})'$$

Therefore:

$$P(\text{Male})'=P(\text{Male})'/\text{Denominator for Normalization}$$

$$P(\text{Female})'=P(\text{Female})'/\text{Denominator for Normalization}$$

which guarantees that the definition of probability holds, that is:

$$P(\text{Male})'+P(\text{Female})'=1$$

Each time that a cookie/viewer is seen visiting a polarized site, the probabilities are re-adjusted. Multiple hits on highly polarized sites of the same orientation rapidly result in gender assessments with probability generally exceeding 0.95.

Finally, any time it becomes useful to delineate a male or female segment from the database of classified polarized viewers/cookies, all members are analyzed and their probabilities for a particular VC are compared S312 with a threshold for whichever direction is dominant for the particular VC, for example in the case of gender, Max(P(Female), P(Male)).

The chosen threshold value corresponds directly to the predicted overall accuracy for the segment, while the expected accuracy for gender (Male and Female) for example, is equal to the mean probability across all chosen viewers/cookies. One exemplary and non-limiting threshold would be 0.92, but it can be lowered to increase the size of the pool (reach) traded off against accuracy.

Per step S314, for a cookie/viewer and a particular VC, if the polarization probability is greater S314 than the threshold value, that Cookie/Viewer is recorded S316 as polarized for the specific VC (gender, age group, etc) with the specific probability value also being optionally recorded in the known viewer database. If on the other hand, that cookie/viewer has a polarization probability less than the threshold value, then the probability value for that Cookie/Viewer may be still optionally recorded S318 for the specific VC (gender, age group, etc) in the known viewer database. After either steps 316 or S318, the next cookie/viewer S320 is analyzed per step 310.

Note that it is preferable that multiple cookie/site hits are not recorded, so hitting the same site again and again won't change a viewer's probabilities. Also note that it is significant that only highly polarized MPs are considered as "polarized"—using all probabilities would result in a per-cookie assessment in which the biases would be drowned out by the more frequently seen sites that are not polarized.

Figure 4:
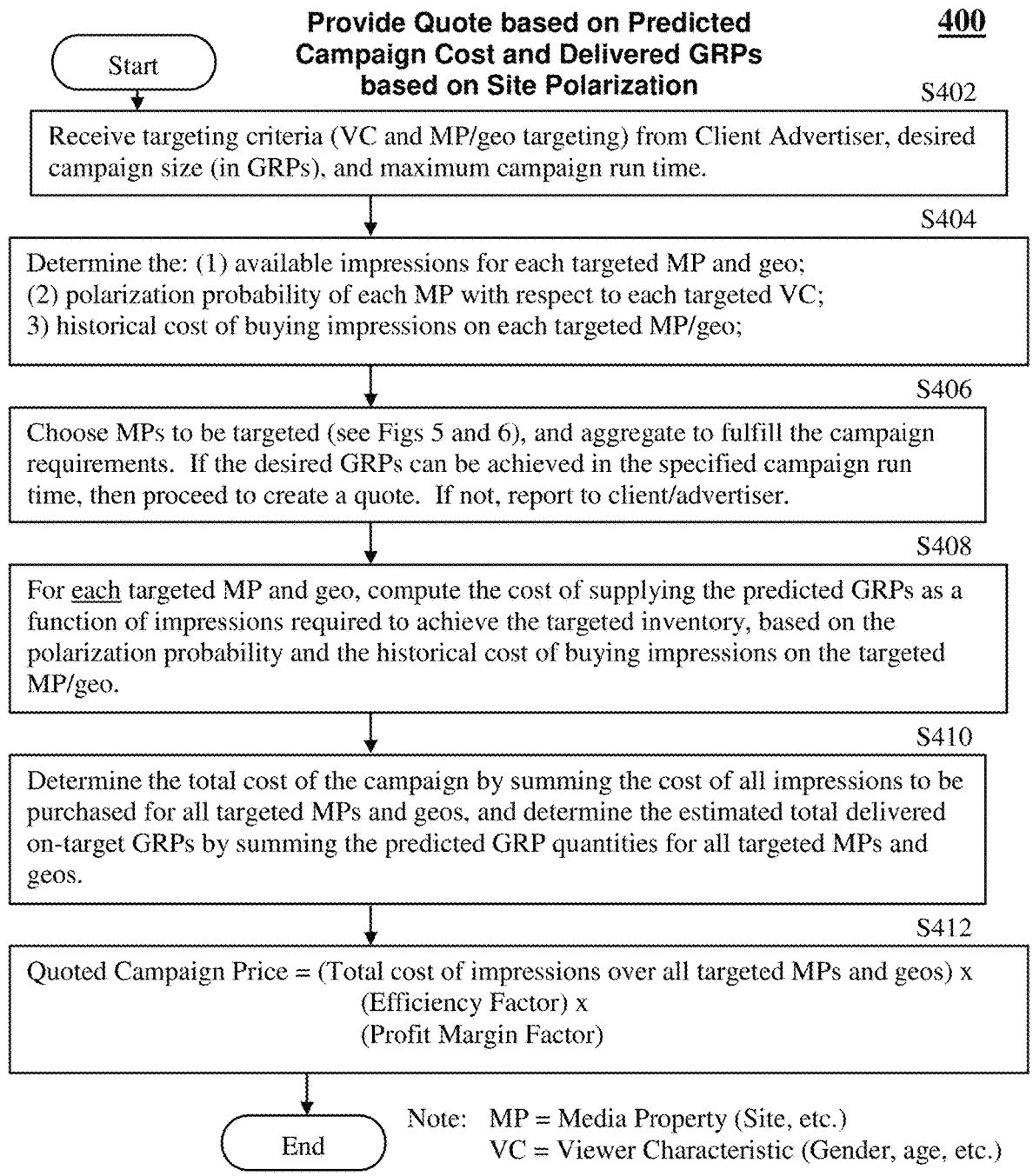
FIG. 4 shows a flowchart for the process whereby prices quoted to an advertiser client for on target GRPs delivered for an electronic advertising campaign based on site polarization profiles.

Once a set of viewers/cookies has been thus classified with high accuracy, they can be used as a further means to profile MPs for polarity in a manner similar to how the truth set is utilized per the process of FIG. 4. In this case however, since unlike the truth set each VC for a particular polarized viewer is typically less than 100% probable, the analysis must take into account the probability for each VC for a particular viewer/cookie being used.

Also, the approach can extend beyond just sites/apps/games to partial URLs, verticals and any other attributes that are available in auction protocols. Furthermore, with the appropriate truth set, classification can be extended to age brackets, marital status, children in household, etc.

Extensions of the methods described herein include, for example, where the number of classified viewers/cookies in the known viewer database is increased by adding "look-alikes". Here, cookies/viewers that did not hit any polarized sites are classified based on similar behavior to classified cookies where the classified cookies have a probability established for different VCs.

Determining Look-Alike Viewers Based on Polarized Viewers

Look-Alike modeling has been used for some time in advertising campaigns and is currently used in electronic and online advertising. In general, look-alike modeling includes selection of a trait or target segment and data sources for analysis, including a baseline population database for comparison. The analysis looks for viewers in the data sources that are identical or similar to viewers in the baseline population with respect to the selected trait or target segment. Then, newly discovered traits are ranked in order of influence or desirability. The ranking may be a number between, for instance, 0 to 1. Ranks closer to 1 means they are more like the audience in the baseline population. Also, heavily weighted traits are valuable because they represent new, unique viewers who may behave similarly to the established audience represented in the baseline population. The result is a database of "Look-Alike Viewers" who have characteristics similar to those in a well-characterized baseline population. For the invention, the baseline population is typically the database of known, polarized viewers. Adding look-alike viewers to the database of known viewers enables larger campaigns to be addressed where the database of known polarized viewers alone is not large enough to meet the campaign requirements in terms of reach and/or run time. Also, since a look-alike viewer has not been profiled by the method described for FIG. 3, the polarization probability for a look-alike viewer may optionally be down-graded relative to that of the known polarized viewers that were used to determine the look-alike viewer. For example if the male gender assessment for known male polarized viewers is 95%, then the gender assessment for a look-alike polarized viewers might for example be 80%.

Predicting, Pricing, and Selling GRPs

While ad campaigns historically are priced by impressions, an impression does not guarantee that a targeted viewer has interacted with the MP. The ability to purchase an ad campaign and know that the reach (on-target viewed ads) is guaranteed would be advantageous for an advertiser. For a demand-side-platform or online ad agency to price according to GRPs or "reach", requires a statistical confidence in the ability to supply a given degree of on-target reach for a given number of impressions purchased, in order to offer such a service at a profit. An on-target view is one where the viewer's characteristics match the targeted characteristics of a campaign. For instance, if an ad campaign is for men's sporting goods, male viewers are typically targeted. When an impression is presented to a female, such a viewing would NOT be on-target for that campaign.

A large historical database is required to support an offering capable of guaranteeing a level of GRP reach, so that the cost of reaching specific categories of viewer can be predicted with an acceptable level of statistical probability. According to one exemplary and non-limiting embodiment of the invention, viewer activity is bucketed over an extensive period of time where MPs (Sites) are profiled according to characteristics (age bracket, gender, etc.) of visiting viewers, and a degree of "polarization" is established for each MP with respect to each viewer characteristic (VC).

Viewers are classified according to their propensity or polarization to visit polarized websites, with respect to each VC type. Systems and methods for creating such databases are described herein with respect to FIGS. 1-3. The cost of each viewer interaction is also accumulated. Thus, a historical summary may be referenced that indicates how many MPs are historically in a bucket (classification category), and the cost of reaching those viewers. For any VC with respect to either an MP or a known viewer, a polarization probability—typically described as a fraction or percentage—is available as a result of the processes described with respect to FIGS. 1-3.

The definition of GRPs (Gross Rating Points) for online advertising such as that addressed herein, is (Reach×Frequency), defined more specifically as:

(number of unique views/online population segment or specific target audience)×(average exposures per viewer over the course of the campaign)

The process of quoting a GRP campaign to a client/advertiser begins with step S402 of flowchart 400 of FIG. 4, where a demand-side platform or online advertising agency receives targeting criteria from the advertiser client. This targeting criteria includes desired VC targeting as well as any MPs and specific geographic locations (geos) the client desires to target. A maximum runtime for the campaign is also included. The desired campaign size (reach) in GRPs may also be provided by the advertiser client. Subsequently according to exemplary and non-limiting embodiments described herein the demand-side platform provides a quotation (price) for GRPs that are "on target"—in other words the reach for the campaign is guaranteed to include viewers that possess the specific targeting characteristics specified by the client/advertiser.

In step S404, the demand-side platform determines the available impressions for each targeted MP and Geo as well as the polarization probability of each targeted MP with respect to each targeted VC, and the historical cost of buying impressions on each of the targeted MPs. Specific MPs to be targeted for the campaign are chosen 406 according to flowcharts 500 and 600 of FIGS. 5 and 6 respectively. Per FIGS. 5 and 6, MPs are chosen and aggregated either based on client selection and/or automatically based on the historical cost in proportion to the polarization probability for an MP (typically described by $ per % point). At the start, the client may supply a list of MPs and geos from which the demand side platform may choose automatically in order to assemble a possible campaign (per FIG. 5), or alternately, the client may specifically choose each MP and Geo that are to be part of the campaign (per FIG. 6).

Per S406 the total number of impressions that must be purchased to achieve the desired level of on-target GRPs is then determined. Subsequently in S406 it is determined if the desired GRPs can be achieved in the specified campaign run time. If that is the case, the process proceeds to step S408. If desired on-target GRPs cannot be achieved, this result is reported to the client/advertiser.

To create a price quotation, per S408 each targeted MP and Geo are examined to determine the cost of supplying the predicted GRPs as a function of impressions required to achieve the targeted inventory, based on the polarization probability and the historical cost of buying impressions on the targeted MP/geo. In general, "inventory" is the quantity of impressions typically available on a specific MP during a specified campaign run time. This is determined historically and the most relevant data is typically the most recent.

In general, since the polarization probability of any MP is less than 100% for any VC, a larger number of impressions will need to be purchased in order to achieve the desired number of on-target views required to provide the requested GRPs. For example, a campaign may find that 10,000 impressions are available on YouTube during the campaign run time. YouTube has a polarization probability value of 0.45 for Males (45% of the audience is male), so if 10,000 impressions are purchased on YouTube for a male-targeted campaign, the on-target impressions are 4,500 and the potential wastage is 5,500. The cost of providing the 4,500 on-target impressions is the calculated as the cost of purchasing 10,000 impressions. The number of impressions to be purchased for an MP is therefore equal to the desired on-target impressions divided by the polarization probability for that MP with respect to a targeted VC, the polarization probability being expressed as a fraction representing a probability percentage. Also, when a campaign is targeting more than one VC—for instance males plus a specific age bracket such as 18-25—the polarization probabilities for both VC should be taken into account for that VC. One exemplary and non-limiting method to combine the effect of both VCs is to multiply the polarization probabilities to produce a composite polarization probability for the MP with respect to that specific campaign.

Per S410, the total cost of the campaign is then determined by summing the cost of all impressions to be purchased for all targeted MPs and geos, and the estimated total number of delivered on-target GRPs is determined by summing the predicted GRP quantities for all targeted MPs and geos.

Finally per S412, a Campaign Price to be quoted is computed according to the following exemplary and non-limiting formula:

Quoted Campaign Price=(Total cost of impressions over all targeted MPs and geos)×(Efficiency Factor)×(Profit Margin Factor)

Here, the efficiency factor and profit margin factor are variable and may be altered by the demand-side platform from one campaign to another depending upon campaign results and other factors. A method for adjusting the efficiency factor from time to time is described by the process shown in FIG. 7.

Figure 5:
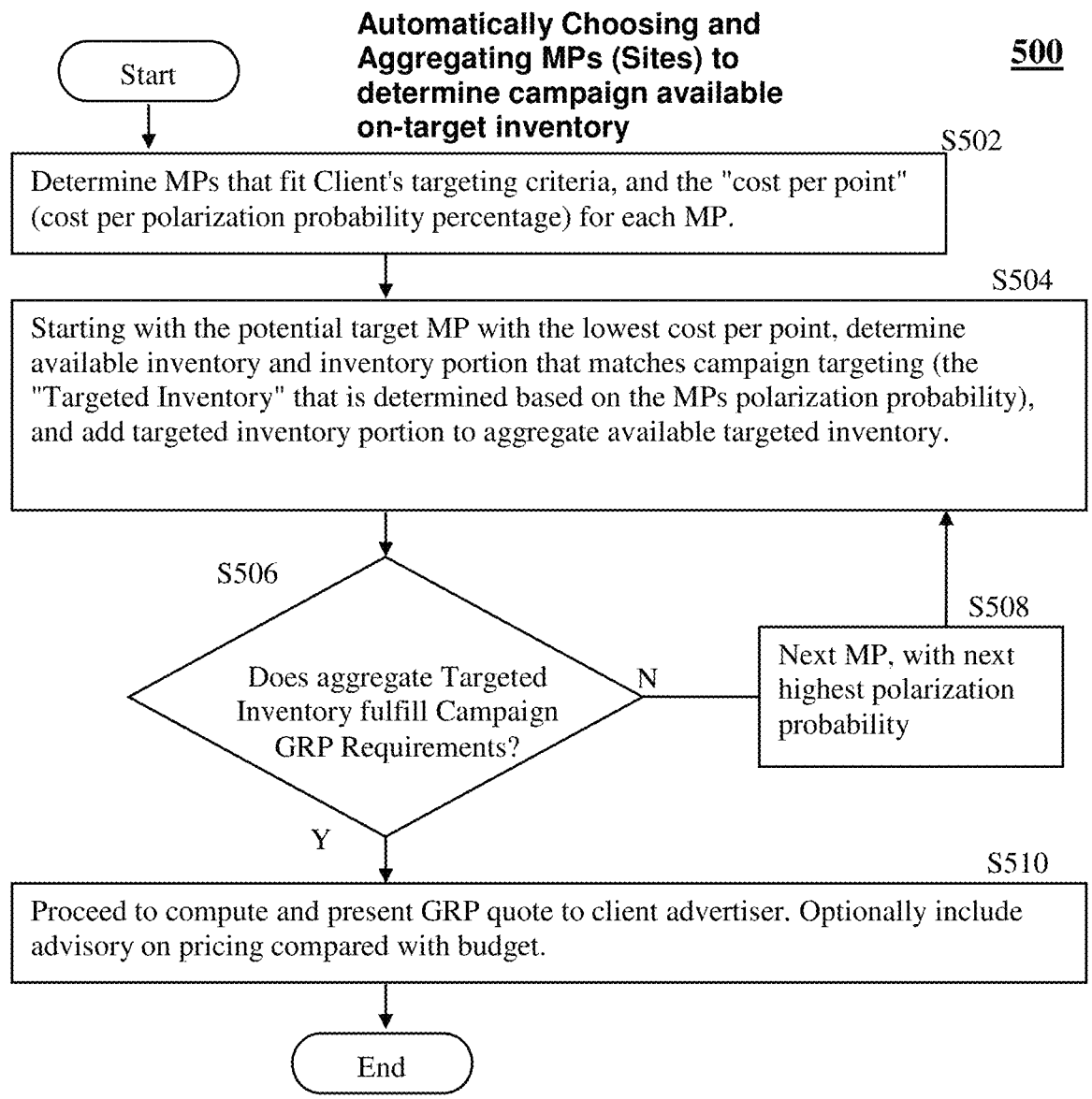
FIG. 5 shows an exemplary process for choosing and aggregating Media Properties (MPs) automatically to determine available campaign inventory.
Figure 6:
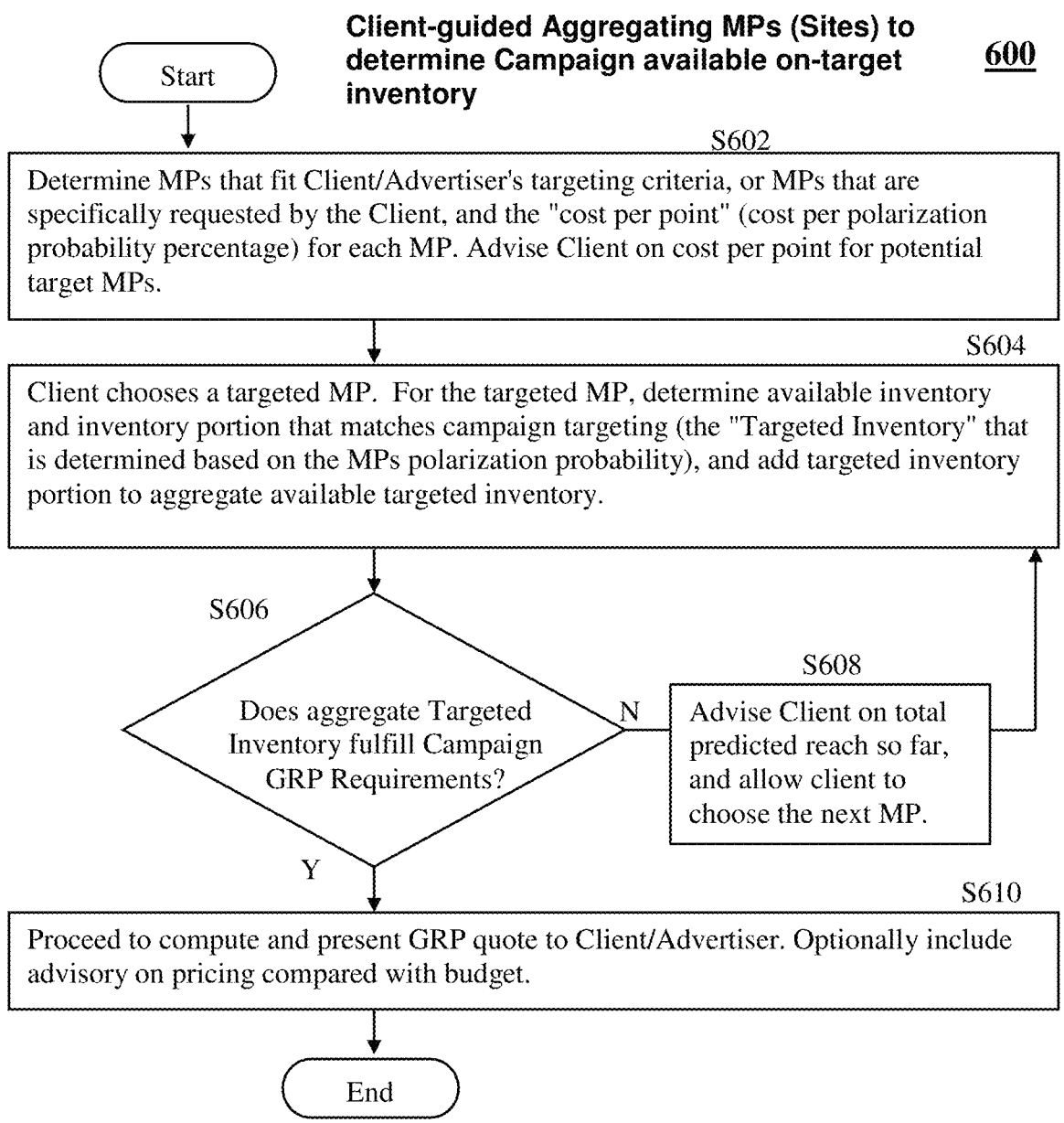
FIG. 6 shows an exemplary process for choosing and aggregating MPs to determine available campaign inventory wherein a client specifically chooses MPs to be included in the campaign.

FIGS. 5 and 6 show flowcharts for processes whereby MPs are chosen and aggregated to determine a total quantity of on-target inventory that is available for a specific campaign.

FIG. 5 shows a process whereby a demand-side platform may automatically choose which MPs are used in a campaign, either from a list of possible MPs supplied by a client/advertiser, or alternately from all possible MPs that have previously been profiled for polarization. According to an alternate embodiment, the process may mix MPs specified by the advertiser/client with other MPs having known polarization profiles in order to assemble a campaign. Typically, a client/advertiser will choose which of these alternatives they would like the demand-side platform to utilize in assembling a campaign.

According to flow chart 500 of FIG. 5, a system according to the invention automatically determines 502 MPs that fit a client's targeting criteria, and also determines the "cost per point" or cost per polarization probability percentage for each MP. Thus when selecting MPs to add to the campaign, the system can qualify the cost-effectiveness of each such addition. If the polarization percentage or probability was the sole factor evaluated in determining which MPs to add to the campaign, a highly polarized site might be added but have such an extreme cost that it consumes the campaign budget well before the desired number of on-target impressions has been reached. As a result it is preferable to prioritize the addition of MPs to a campaign according to the cost-per-point rather than simply on polarization probability.

For any MP, there is a relationship in aggregate between winnable impressions and CPM bid, and this data is accumulated over time and is available to help determine what inventory is available a bid price. This is used to estimate how many impressions are buyable at any CPM bid. This data may be utilized for determining available impressions and cost. Thus, if an MP does not have enough targeted inventory at a given bid price point, the bid price can be raised to produce more inventory, however at a higher cost per point. Thus, the bid price may be adjusted by the client/advertiser or automatically by the system in order to provide more inventory from highly desirable polarized sites.

Per step S504, the process starts by identifying the potential target MP having the lowest cost per point, and determining for that MP the available inventory as well as that portion of the available inventory that matches the campaign targeting criteria. This portion then becomes the "on target" inventory or "targeted inventory" and is determined based on the MPs polarization probability. For example during the runtime allocated for a campaign, assume that an MP called "X" historically would have 10,000 impressions available. If the polarization percentage for MP "X" is 60% for a VC describing male viewership and the campaign in question is targeting male viewers, then during the runtime for the campaign it follows that there will be 6,000 on-target viewers receiving impressions. The campaign will however have to pay for the entire 10,000 impressions in order to provide the 6,000 on target impressions. After this MP having the lowest cost per point has been added to the campaign, the system evaluates S506 whether or not the aggregated on-target inventory fills the campaign GRP requirements. If not, the flow proceeds S508 to locate the next MP having the next lowest cost per point where the polarization is in line with campaign targeting. Subsequently step S504 is executed again for this next MP.

Upon adding an MP to the campaign, should it be determined per step S506 that the campaign GRP requirements would be fulfilled, the flow proceeds to S510 where a quotation for the campaign in terms of price and GRPs is prepared and provided to the client/advertiser. Optionally the client/advertiser will be advised on how the quoted price compares with any established budget.

According to flow chart 600 of FIG. 6, a Client/Advertiser supplies a list of MPs to be targeted and may specifically add MPs to a campaign. The system according to the invention automatically determines 502 the "cost per point" or cost per polarization probability percentage for each MP, and advises the client. Thus when selecting MPs to add to the campaign, the Client can be aware of the cost-effectiveness of each such addition.

Per step S604, a client chooses a targeted MP to add to the campaign. For the targeted MP, the system according to the invention then determines available inventory and the inventory portion that matches campaign targeting (the "Targeted Inventory" that is determined based on the MPs polarization probability). This targeted inventory portion is then aggregated into the available targeted inventory.

After this MP has been added to the campaign, the system evaluates S606 whether or not the aggregated on-target inventory fulfills the campaign GRP requirements. If not, the flow proceeds S608 where the client is advised on total predicted reach so far, and the client proceeds to choose the next MP to add to the campaign. The flow then reverts to step S604 where the client chooses another MP to add to the campaign.

Upon adding an MP to the campaign, should the system according to the invention determine per step S606 that the campaign GRP requirements would be fulfilled, the flow proceeds to S610 where a quotation for the campaign in terms of price and GRPs is prepared and provided to the client/advertiser. Optionally the client/advertiser will be also advised on how the quoted price compares with any established budget.

A simplified example might include a campaign that has two target sites. Site #1 has a polarization factor of 60% male and site #2 has a polarization factor of 70% male. The campaign is targeting males. So, for site #1 the campaign would need to purchase 100 impressions to get 60 on target, and for site #2 the campaign would we need to purchase 100 impressions to get 70 on target. If the campaign goal was to reach 130 on-target impressions, 60 would be from site #1 and 70 from site #2. If the campaign goal was higher, but the available inventory on sites #1 and #2 was only 100 impressions each, the demand side platform would tell the client that only 130 on-target impressions can be delivered unless they add more sites to the campaign. Also for this simplified example, according to FIG. 5 site #2 would be added to the campaign before site #1.

Figure 7:
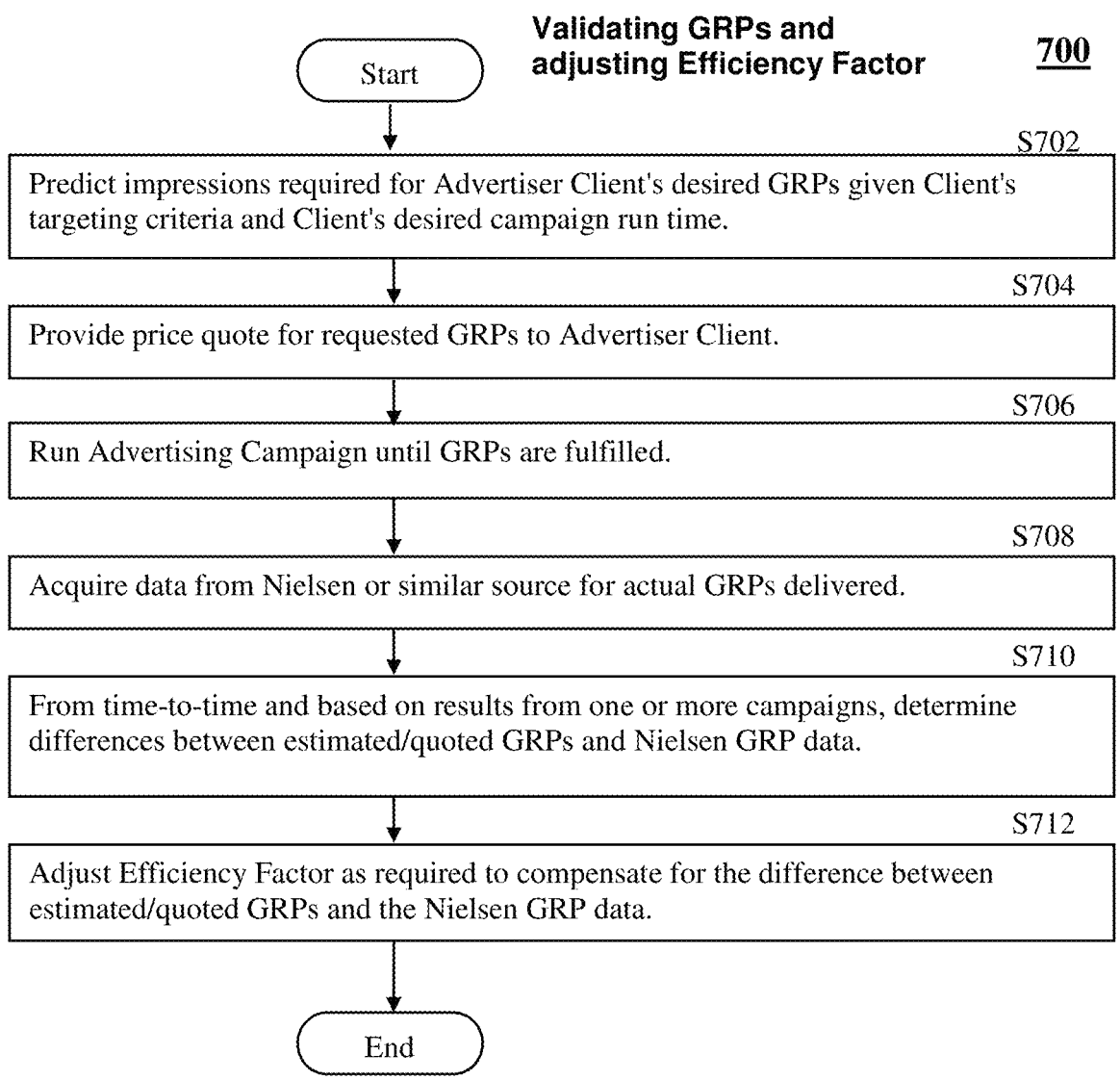
FIG. 7 shows an exemplary process for operating an electronic advertising campaign whereby a quantity of on-target GRPs are provided to a client advertiser at a predetermined quoted price, and from time to time after a campaign has been completed, an Efficiency Factor is adjusted based on GRP data acquired from a third party such as for example, Nielsen.

The overall flow for operation of an electronic advertising campaign according to an exemplary embodiment of the invention is shown in FIG. 7, including validation of GRPs delivered and adjustment of an efficiency factor. As mentioned earlier, information is typically available from third-party organizations such as Nielsen after an advertising campaign has been run that quantify the reach or GRPs achieved by the campaign. Since the method for estimating and providing a GRP quote before a campaign has run involves statistical predictability, the ability to reconcile with actual achieved reach after a campaign is implemented through the "efficiency factor" is an important component of the process. As the efficiency factor is adjusted from time to time comparing predicted results with real results, the ability to predict future campaigns with greater accuracy is improved. By performing this reconciliation from time to time and not after each campaign has run, the efficiency factor is adjusted in a controlled environment rather than on random campaigns. This avoids the possibility that individual campaigns may have unique or even aberrant differences that would throw off the result to some extent.

Per flow chart 700 of FIG. 7, impressions required to be purchased to achieve an advertiser/client's desired GRP amount are estimated S702 given the client's targeting criteria and the client's desired campaign run time. In step S704, a price quote for requested GRPs is provided to the advertiser/client. Per step S706, the advertising campaign is run until the required GRPs are achieved or until the budget is spent. Then, in step 708, data is acquired from Nielsen or a similar source including actual GRPs delivered for the campaign. In step 710, from time-to-time and based on results from one or more campaigns, the difference between GRPs estimated prior to campaigns and the Nielsen data for GRPs actually delivered is calculated. A comparison can also be made between the Nielsen GRP data and GRPs recorded by the demand side platform for each campaign. Finally per step S712, the Efficiency Factor is adjusted as required to compensate for the differences between estimated/quoted GRPs and Nielsen GRP data, or alternately between GRPs delivered as recorded by the demand side platform and the Nielsen GRP data.

Quoting GRPs Based on MP Polarization and Viewer Polarization

When campaign reach is estimated based only on site polarization profiles, determining the available on-target inventory for a campaign is performed with respect to FIGS. 4-6. For these estimates, the process is limited to the polarization of the sites. If a site has a 60% male polarization and a campaign is targeting males, then on average it is expected that up to 40% of the impressions purchased on this site will be essentially wasted. In order to get the on-target rate above that of the sites themselves, it is necessary to also take into account the polarization of the viewers in the known viewer database, and pass over unknown viewers to focus on known polarized (or look-alike polarized) viewers.

At the same time, if the campaign passes over unknown viewers in favor of known polarized viewers, the effective available inventory could go down significantly, and with it the statistical confidence that the requirements for a campaign being estimated and quoted can be fulfilled. One solution is to mix in some unknown viewers, and the strategy for mixing can be validated by comparing GRP results with pre-campaign estimations after campaigns are run in a similar way that the Efficiency Factor is utilized per FIG. 7.

Assuming the database of known viewers—including known polarized and look-alike polarized viewers—is large enough to encompass a majority of potential viewers of a campaign, and assuming that a campaign is targeting MPs that have a reasonable degree (above 70%) of polarization for targeted VCs, mixing in unknown viewers may not dilute the campaign significantly since it would be expected that polarized viewers would be visiting the polarized MP anyway.

To get substantial benefit from known viewers, a campaign would have to pass over unknown viewers at least in the early part of the operational period or run time of a campaign. As a campaign progresses, the viewers receiving ad impressions for the campaign on targeted sites can be tracked by a system according to the invention. As long as the success rate for on-target impressions is such that the campaign is on track to be fulfilled during the allotted run time, no additional unknown viewers would need to be mixed in. If the success rate drops below this, then unknown viewers would be added in including a larger percentage of wasted impressions.

Alternately, a campaign can start by targeting a mix of known and unknown viewers and then adjust the mix during the run-time based on the success rate for on-target impressions. How the initial mix is determined can depend on the polarization probabilities for targeted sites and the quantity of known polarized and look-alike polarized viewers in the known viewer database that match the targeting criteria. Again, the correlation between GRPs estimated prior to a campaign and GRPs delivered during a campaign is validated after a campaign by comparing with GRP data such as that supplied by Nielsen. If on average there are discrepancies, then the method for determining the initial mix of known and unknown viewers can be appropriately adjusted.

Figure 8:
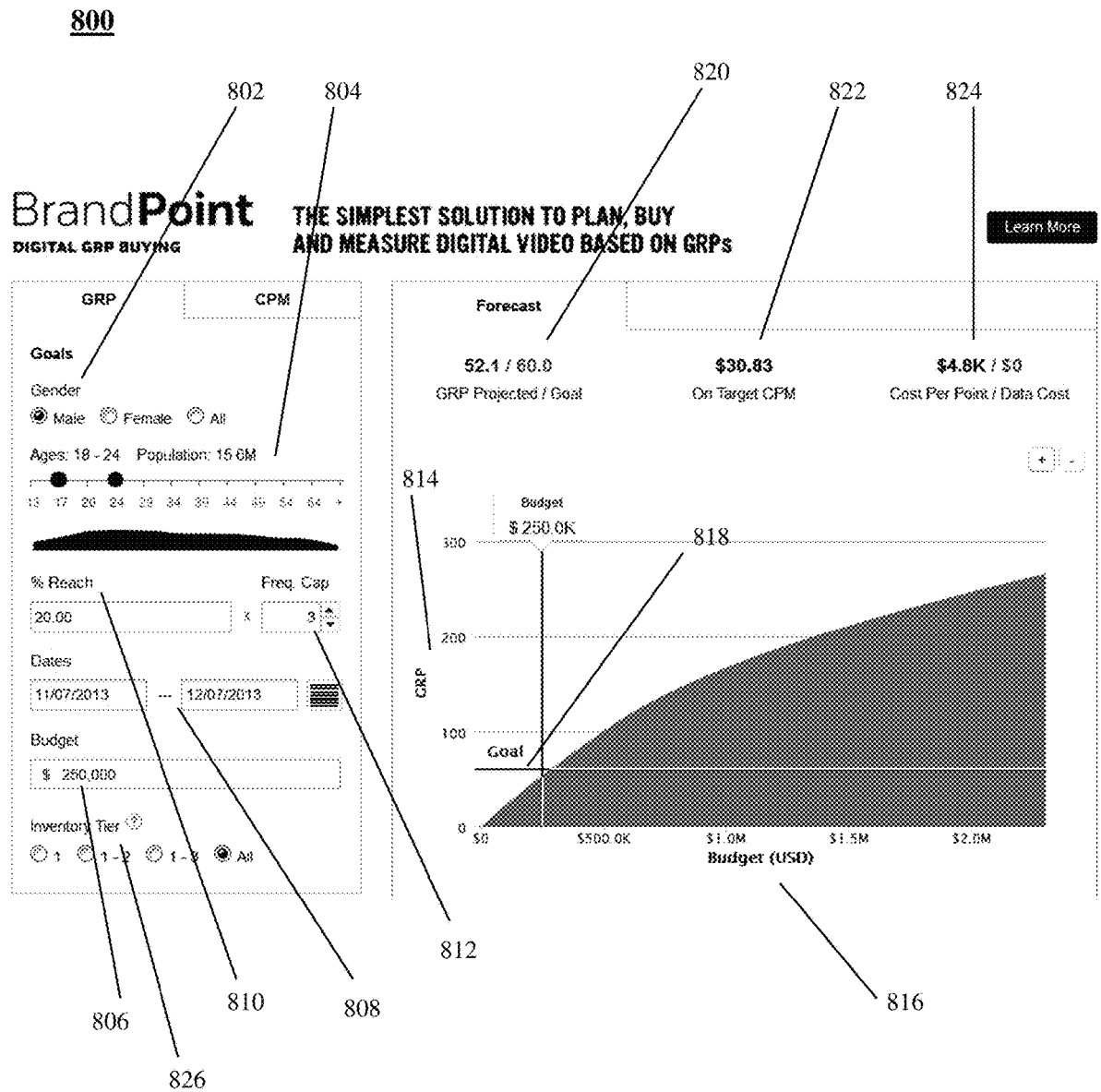
FIG. 8 shows an exemplary user interface whereby a user enters parameters that guide an online advertising campaign and is directly presented with an estimated resultant GRP quantity and an estimated cost for the campaign.

An exemplary user interface for estimating the results and cost of an online advertising campaign is shown in FIG. 8. A client/advertiser or alternately an associate of a demand-side platform enters certain parameters that affect a campaign, and according to this embodiment of the invention they are presented with an estimation of campaign results. A user may choose targeting parameters for demographic categories such as gender 802 and population segment 804. For this example, population segment 804 has been chosen to be ages 18-24 which when combined with a male segmentation 802 produces an estimated targeted population of 15.6 million potential viewers. One exemplary method for choosing the population segment 804 is shown as a user controllable graphic slider presented to a user, wherein the user manipulates a lower bound icon and an upper bound icon on the user controllable graphic slider to indicate a targeted age bracket. Further, a graph of available inventory resulting from the user's demographic inputs is also presented below the user controllable graphic slider as an aid to the user in choosing the targeted age bracket.

A target budget 806 is chosen—for this example $250,000. The user then enters a desired reach 810 for the campaign which is represented as a percentage of the target population 804, along with an allowed frequency 812 which for this example has been chosen to be equal to three. The frequency specifies a number of times an advertisement may be shown to a member of the targeted population, and be counted as an on-target impression.

Additionally, a user may choose one or more classifications or segmentations of MPs to be addressed by a campaign, herein labeled "Inventory Tiers" 826 in FIG. 8. For this non-limiting example, available classifications are shown as tiers ranging from MPs that are very well-recognized to those that are less recognizable. For example, Tier 1 can represent sites a user's friends and family would recognize. Tier 2 can represent MPs with lower brand recognition or awareness. Tier 3 can represent brand-safe sites that are niche or reach. "Brand safe" refers to MPs where there is nothing controversial such as guns, sex, violence, or alcohol, etc. "Niche" means there is a smaller audience, such as for instance a site for vegan cooks. "Reach" sites are MPs with huge audiences and many demographics such as YouTube, CBS, etc. Reach sites provide broad exposure, however with little specific brand alignment.

To provide interactive feedback to the user, a graph is generated as shown in FIG. 8 based on parameters input by the user. The graph includes GRPs 814 on one axis, and possible campaign budgets 816 required to achieve a GRP result on the other axis. The campaign goal 818 is displayed as a reference level indicated on the graph, and a forecast 820 is also shown that indicates the GRP level estimated to be achieved by the campaign during the allotted run time 808 and within the target budget 806. Also shown in forecast 820 is the GRP goal resulting from the desired reach 810 and the frequency cap 812. The estimated cost 822 for on-target impressions is shown as well as the cost per GRP 824. In addition to receiving from a user input parameters shown in FIG. 8, other parameters may be received including for example specific targeted Media Properties, targeted geographic locations, and other viewer characteristics besides gender and age such as for instance a historical tendency to view and/or purchase certain classes of product or service.

Figure 9A:
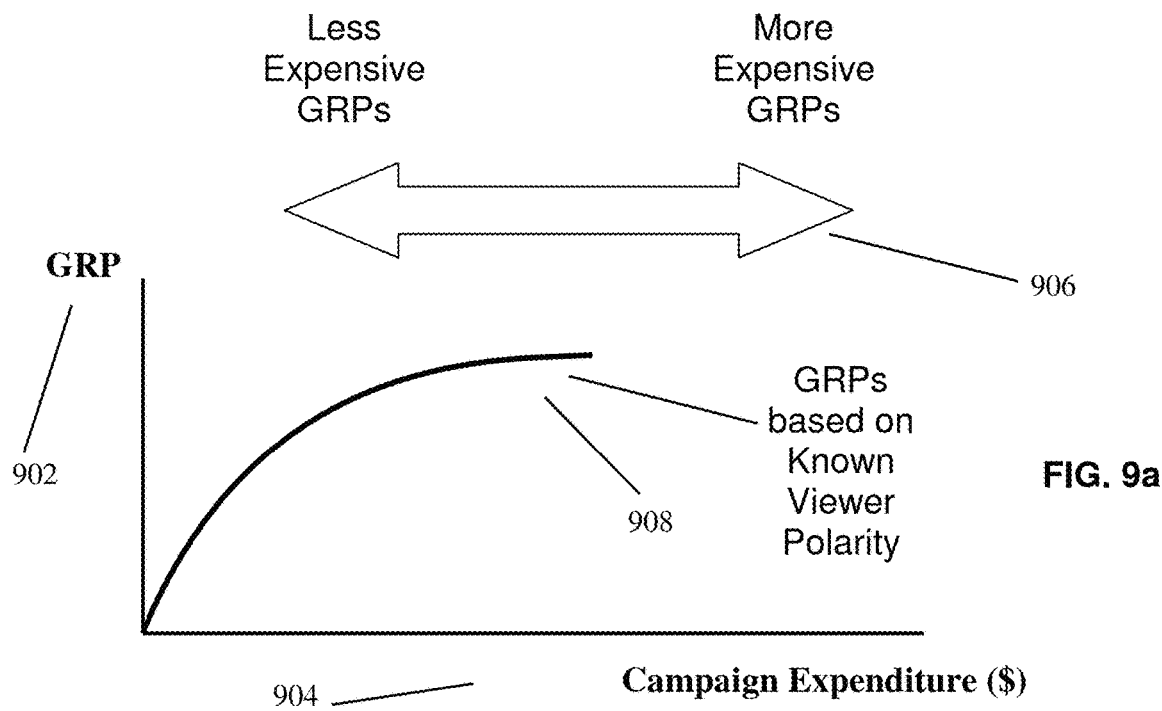
FIGS. 9a and 9b demonstrate how GRPs result as capital expenditure increases for a campaign.
Figure 9B:
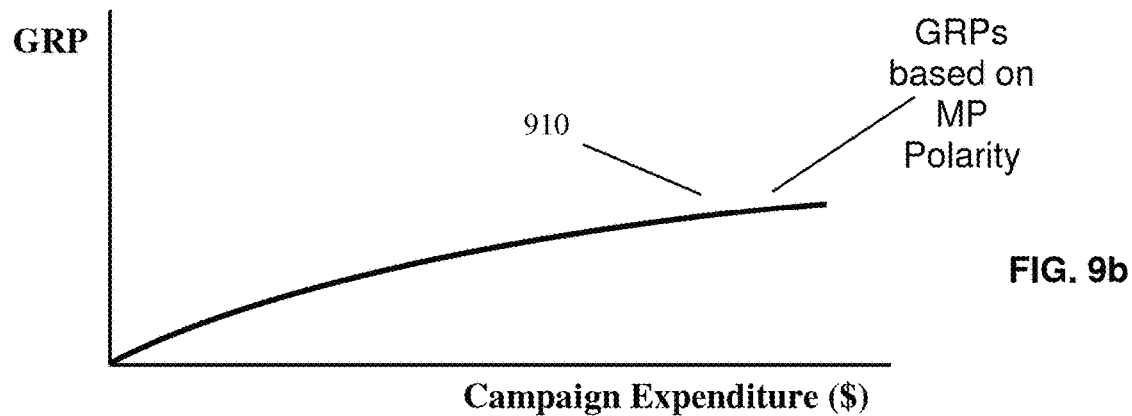

Diagrams 900 of FIG. 9 describe how the rate of GRP fulfillment varies with campaign expenditure when comparing a campaign focused on polarized viewers versus a campaign focused on polarized MPs. FIG. 9A shows GRPs 902 as a function of campaign expenditure 904 where the resultant curve 908 is for a campaign based on serving ad impressions specifically to polarized viewers. In general, ads served to polarized viewers have a higher probability of being on target when compared with ads served solely to unknown viewers visiting polarized MPs. At the same time, the available inventory of polarized viewers is typically much smaller than the available inventory of all viewers visiting polarized MPs. So, even though the rate of GRP fulfillment with capital expenditure is higher in FIG. 9A addressing polarized viewers, the inventory of polarized viewers alone may only be sufficient to fulfill smaller campaigns. Also note that as capital expenditures increase, the rates of GRP increase for curves 908 and 910 are reduced, and thus per arrow indicator 906 as capital expenditure increases GRPs become more expensive. This is due to the fact that for a very small campaign (small campaign expenditure) MPs with relatively low cost of impressions can be addressed for campaigns focused on polarized viewers, polarized MPs, or a mix of the two. When a larger numbers of impressions are required, the campaign must also address MPs with higher costs of impressions. Also note that for both curves 908 and 910, as the campaign expenditure increases, the curve eventually starts to flatten essentially providing diminishing returns for further capital expenditure. As such, it may be appropriate for some campaigns to alter the campaign strategy when a cost of impressions (cost of GRPs) reaches a certain level. Some exemplary embodiments of a campaign would start with ads served to polarized viewers until a cost of impressions reaches a level where only the most expensive inventory is being addressed, whereupon reaching that level the campaign would begin to serve ads to unknown viewers—typically viewers visiting polarized MPs. At this point in the campaign, ads could still be served to polarized viewers, or alternately ads could be served only to unknown viewers.

Figure 10:
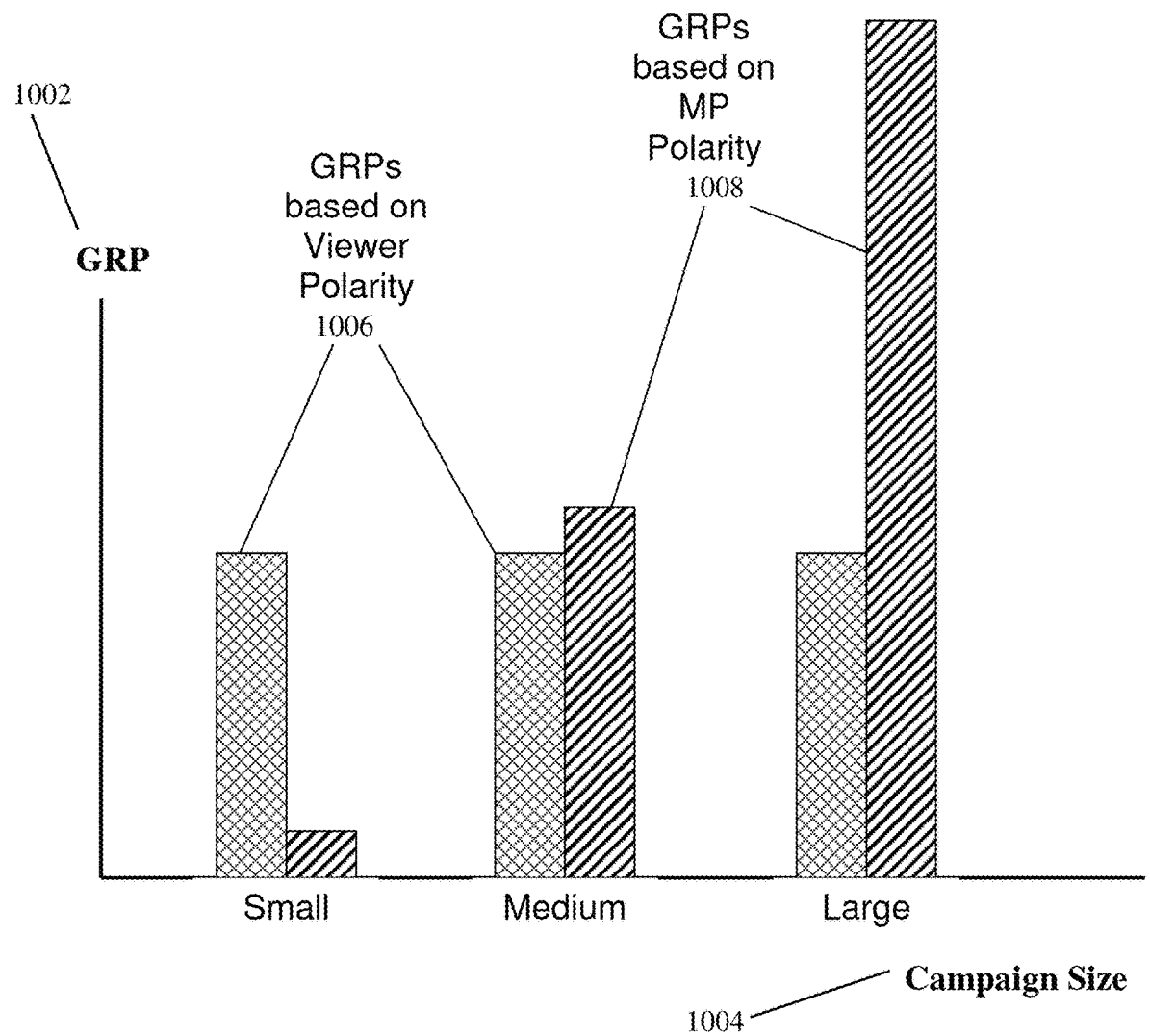
FIG. 10 demonstrates how resultant GRPs apportion between those based on polarized viewers vs. polarized MPs as the size of an online ad campaign varies.

FIG. 10 includes bar graph 1000 where resulting GRPs 1002 are shown relative to campaign size 1004. In particular, GRPs based on viewer polarity 1006 are compared with GRPs based on MP polarity 1008 as campaign size changes. Notice that for very small campaigns, serving ads to polarized viewers alone may be completely adequate to satisfy campaign requirements although a small number of GRPs based on MP polarity may be required depending upon available polarized viewer inventory that satisfies the campaign's targeting criteria. For medium-size campaigns, substantial quantities of GRPs may be required for both polarized viewers and unknown viewers visiting polarized MPs. As shown in FIG. 10 for large campaigns, GRPs will typically result from ads served to unknown viewers visiting polarized MPs.

When predicting campaign results before execution of a campaign, a system operating according to the invention will typically examine targeted viewer characteristics for the campaign and estimate an amount of available inventory of polarized viewers in the database of polarized viewers that meet targeting criteria consistent with the targeted viewer characteristics. Then, based on the required campaign size—typically the total GRPs required in a specified campaign run time—a ratio of polarized viewers served to unknown viewers served is determined. This estimate can be used in predicting campaign results prior to the start of campaign execution, and can also be used as an initial ratio of polarized viewers served to unknown viewers served at the beginning campaign execution.

Note that the available inventory for polarized viewers is also affected by the allotted run time. The estimated rate at which polarized viewers become available is historically derived, and it follows that for a shorter campaign run time fewer polarized viewers will be available compared with longer run times, all other parameters being equal. Also note that while polarized viewers may of course visit targeted polarized MPs, they may also visit other MPs and still be of interest. As such a campaign addressing polarized viewers may serve only polarized viewers visiting specifically targeted MPs, or alternately any polarized viewer with viewer characteristics matching targeting criteria, regardless of what MP they visit.

Figure 11:
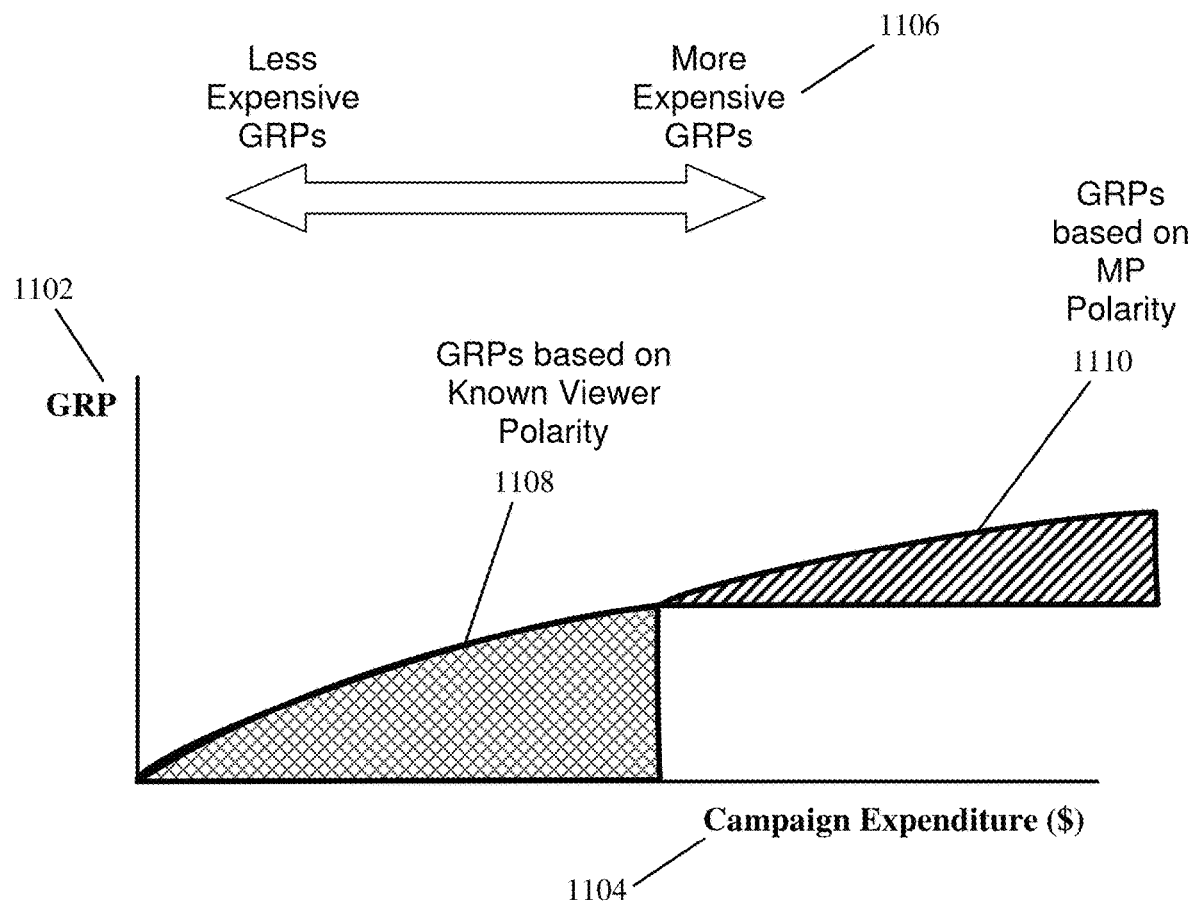
FIG. 11 describes how GRPs result from a campaign that starts by addressing only polarized viewers, and transitions to a campaign that only addresses polarized MPs.

FIG. 11 shows an exemplary campaign strategy where GRPs 1102 are shown as campaign expenditure 1104 increases, with arrow 1106 indicating that GRPs become more expensive as the campaign progresses, and as less expensive GRPs are no longer providing sufficient numbers of impressions per time. This assumes that it is included in the campaign strategy to pass over impression opportunities early in a campaign for MPs which are known to be more expensive, in favor of serving ads to viewers visiting MPs for which ad impressions are less expensive. For the exemplary strategy shown in the graph of FIG. 11, it has been determined that the available inventory of polarized viewers meeting the campaign criteria is large enough that the campaign should start by initially serving only polarized viewers 1108. It is also assumed that less expensive GRPs will be focused on in the initial stage of campaign execution. Then, according to this exemplary strategy a transition is made during the campaign runtime to switch from addressing GRPs based on viewer polarity 1108 to GRPs based on MP polarity 1110. This transition can be triggered by one or more criteria, including the cost of impressions having reached a specific level, or alternately the rate of GRPs fulfillment being determined to be below that required to complete the campaign requirements during the allotted campaign run time.

Figure 12:
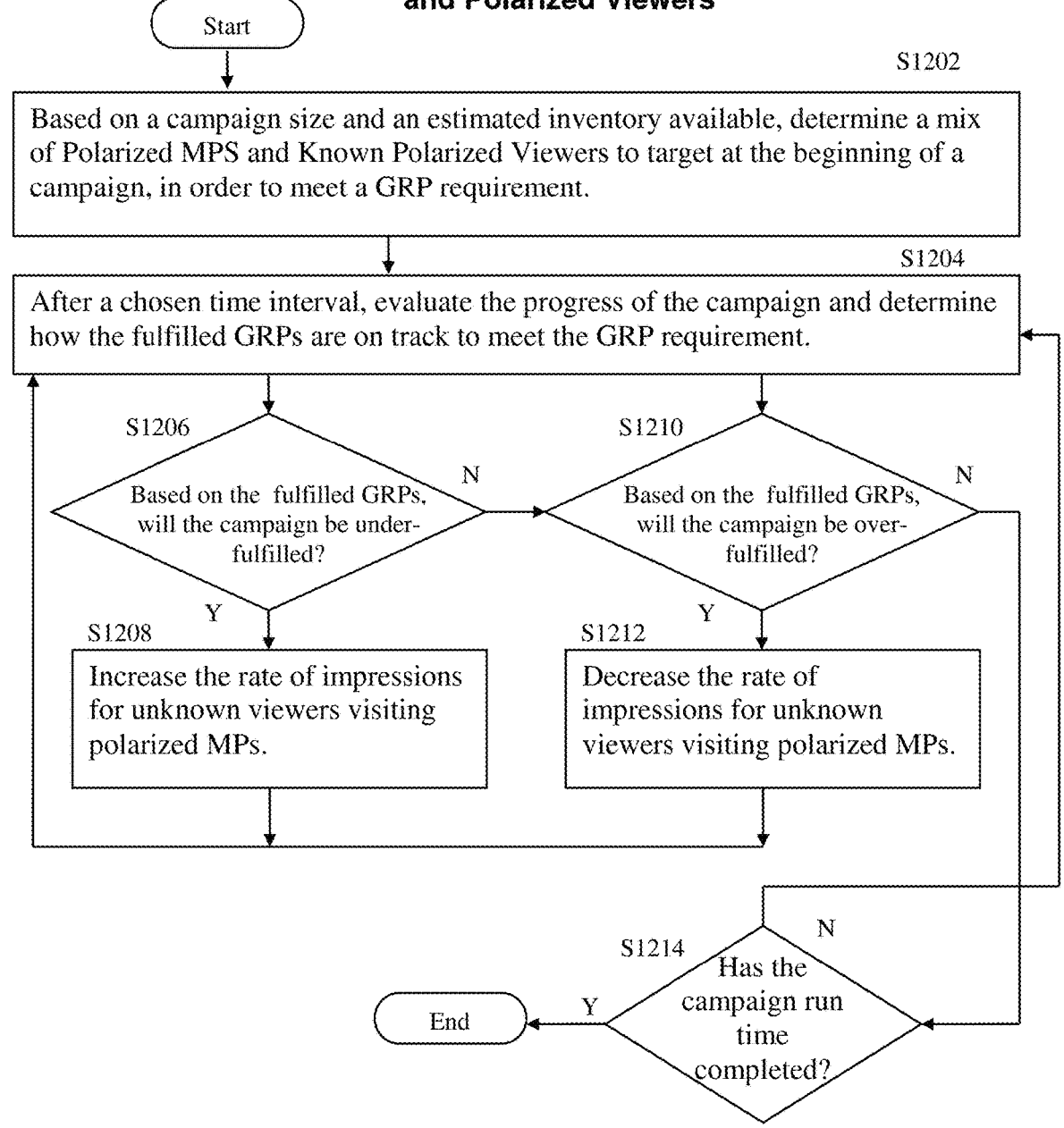
FIG. 12 shows a flow chart describing an exemplary process where both polarized viewers and polarized MPs are addressed from the start of a campaign, and then the ratio of polarized viewer impressions to polarized MP impressions is altered from time to time according to an estimation of campaign results at the end of the campaign run time.

FIG. 12 shows a flowchart 1200 wherein both polarized viewers and unknown viewers visiting polarized MPs are targeted from the beginning of a campaign. Then, according to flowchart 1200, the ratio between targeted polarized viewers and unknown viewers is adjusted during the course of the campaign in order to fulfill the campaign in the allotted runtime. This strategy provides an optimum number of on target impressions by initially focusing on polarized viewers as much as possible. According to step S1202, an initial mix or ratio of polarized viewers to unknown viewers visiting polarized MPs is determined. This initial mix or ratio is based at least in part on a required campaign size (GRPs required) and an estimated available inventory. A specified campaign run time may also be considered in determining the initial mix or ratio. In step S1204, after a chosen time interval, a system implementing the invention evaluates the progress of the campaign and determines if the rate of GRP fulfillment is on track to meet the GRP requirements for the campaign. In step S1206 it is estimated based on GRPs fulfilled thus far if the campaign will be under-fulfilled. If so, per step S1208 the rate of ads served to unknown viewers visiting polarized MPs will be increased. If not, per step S1210 it is estimated based on GRPs fulfilled thus far if the campaign is likely to be over-fulfilled. If so, per step S1212 the rate of ads served to unknown viewers visiting polarized MPs is decreased. If not, then per S1214 it is determined if the campaign run time has been completed. If the run time has not yet completed, then the process reverts to step S1204. If per step S1214 the campaign run time has completed, then the campaign is over and the results are typically reported to the advertiser/client by the demand-side platform.

Also when the campaign has completed, the actual GRPs delivered during the campaign may be obtained from a third party and compared with any estimates for GRPs that were made prior to the start of the campaign. From this comparison, an efficiency factor is determined which is utilized in future campaign predictions and any price quotations that may result as described earlier with respect to FIG. 8.

Viewer Signatures

Signatures for viewers are the result of collecting information about a viewer's online viewing activity over time. At one level, viewing activity consists of the different websites or MPs (Media Properties) that are visited by a viewer and where the viewer is offered an online advertisement as a result of an online media auction. At another level, viewing activity can also consist of a viewer's engagement activity with an MP—for example actions they take upon being presented an advertisement and products or services they buy after viewing an advertisement. Furthermore, attributes of the MPs that a viewer visits such as verticals— categories from a predefined hierarchy (for example: Automotive; Art & Entertainment) either specified by the publishers or automatically assessed via text categorization algorithms.

The following are some example signatures for MPs visited by two exemplary viewers:

Viewer 1: espn.com, nba.com, sports.com, IAB-230, Google-Vertical-54

Viewer 2: vogue.com, fashion.com, babies.com, IAB-432

Signatures such as these provide information that, when analyzed as described herein, determines a variety of demographic segments that a viewer falls into, and further determines a probability that the viewer belongs to each of those segments. Information such as shown above for Viewer 1 and Viewer 2 can help determine not only that Viewer 1 is probably male and Viewer 2 is probably female, it can also assist in determining an age bracket for each of the viewers as well as certain behavioral segments, for instance "sports fans" for Viewer 1, and "fashion conscious" for Viewer 2.

Truth Set Viewers

A "truth set" or "set of viewers with truth" is a control set of viewers where the values for each specific demographic characteristic is known. Truth information on viewers is usually gathered or obtained from sites where viewers register in order to participate, and in the process of registering provide specific demographic information about themselves. Observing and recording the viewing behavior of truth set viewers provides information that is used to create models that are each focused on a particular demographic segment or category, those models being later used to categorize unknown viewers.

More Demographic Categories

Previously in this specification, polarization analysis of both MPs and viewers was described. Typically, this analysis determined with some probability the extent to which a viewer was male or female, and to some extent the degree to which a viewer could be placed in an age bracket. It is useful, however to provide a much more granular analysis capability and place targeted viewers into a wider variety of categories, doing so while assigning probabilities for a viewer with respect to belonging to each category. In particular, it is useful in targeted advertising to have a high degree of granularity for age bracketing.

Examples of Granular Gender/Age Brackets

Female 25-54; and

Male 18-24

In addition to gender and age brackets, analysis can be likewise performed to determine the extent to which a viewer belongs to one or more of certain behavioral segments, for example:

Fashion;

Outdoor Sporting Goods; and

Automotive

Further, additional demographic categories can include for example:

Income bracket;

Married/Unmarried;

Number of children; and

Ethnicity

Ad and site (MP) interaction behavior can also be categorized and targeted by campaigns. For example, such categories can include viewers who are more apt to watch a video to completion, click-thru on an ad, take a survey, purchase a product or service, etc. Another category that can be observed and targeted are "Intenders", for example viewers that have stated that they intend to buy a product (autos, electronics, etc.), typically within a specific time frame.

Building Categorization Models from Truth Set Viewer Signatures

Figure 13:
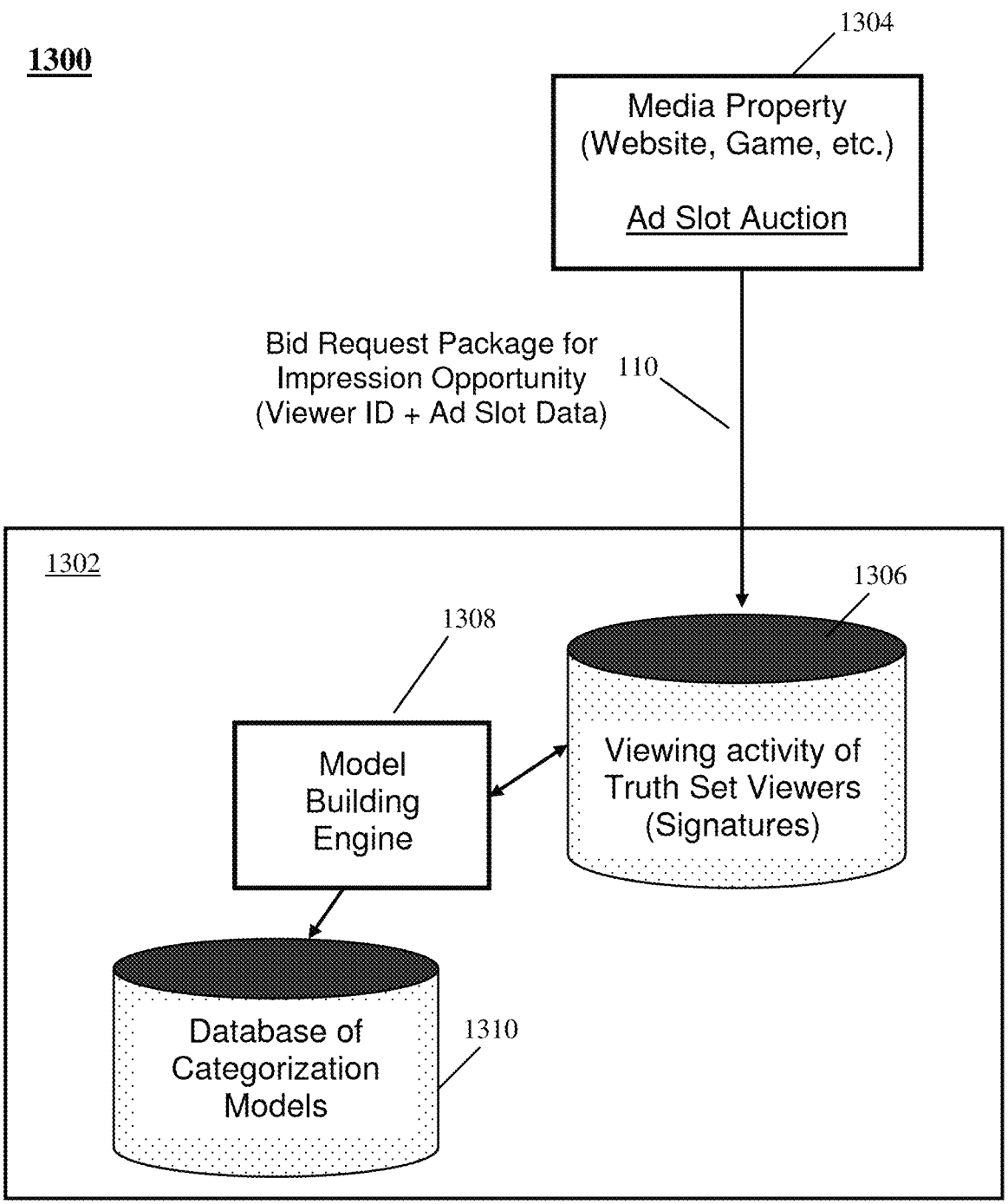
FIG. 13 shows a data flow diagram for an exemplary process where viewing activity of truth set viewers with known demographic characteristics is recorded to produce a "signature" for each truth set viewer, followed by analyzing the recorded signatures to build models that are later used for categorizing unknown viewers.

Once a database of truth set viewers has been acquired or established, viewing activity of these truth set viewers is observed over time as shown in data flow diagram 1300 of FIG. 13. Here, MPs 1304 provide bid request packages 110 for impression opportunities to a demand-side platform 1302 where the viewing activity over time of truth set viewers is observed and recorded in database 1306. These are the "signatures" for the truth set viewers. This signature database 1306 is then processed by model building engine 1308 to produce a database of categorization models 1310. Model building engine 1308 may comprise for example any of a number of machine learning analysis engines known in the art, including for example but not limited to Decision Trees and Ensembles, Neural Nets, Deep Neural Nets, Support Vector Machines, K-Nearest Neighbors, and Bayesian techniques. Once the database of models 1310 has been constructed, unknown viewers can then be categorized relative to a spectrum of specific demographic categories as described for example above. For each demographic category segment, a specific model is generated. Thus, there will be as many models as there are demographic category segments of interest.

Figure 14:
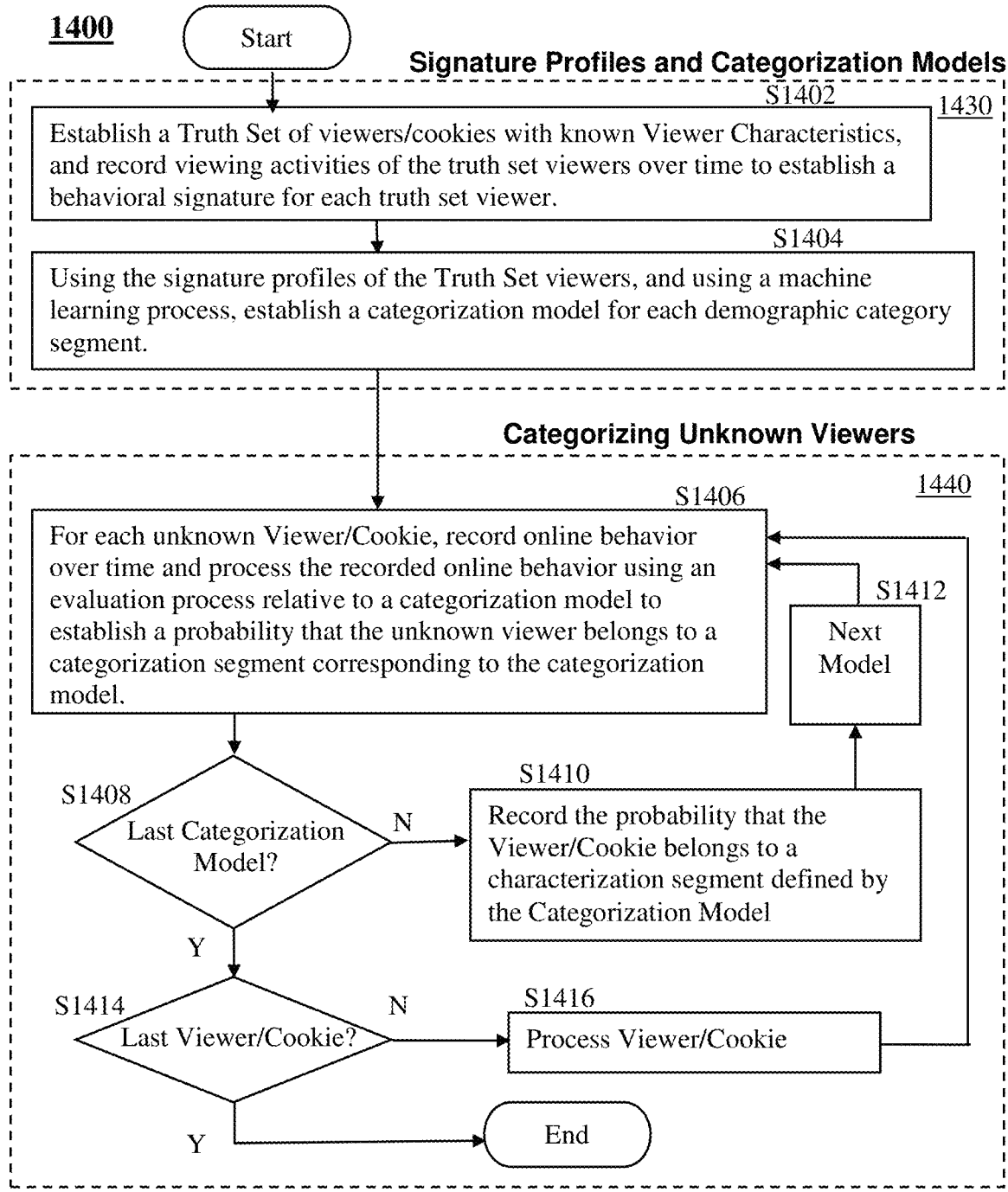
FIG. 14 shows a flow chart for an exemplary process including building models based on the activity of truth set viewers, and using those models to categorize unknown viewers.

The process of recording signature profiles for truth set viewers and building categorization models is further described in beginning process 1430 of flowchart 1400 shown in FIG. 14. In step S1402, a truth set of viewers and their cookies is established whereby the viewer characteristics for the truth set viewers is known. Then over a period of time, viewing activities of the truth set viewers is observed and recorded in order to establish a behavioral signature for each truth set viewer. In step S1404, these signature profiles for the truth set viewers is analyzed using a machine learning process in order to establish a categorization model for each demographic category segment that may be targeted in any future online advertising campaign.

Categorizing Unknown Viewers

Once a set of characterization models has been established using a machine learning process as described above, an unknown viewer can be characterized to determine which demographic segments they belong to, and for each segment, what the probability is that they belong to that segment. This process is repeated frequently for millions of unknown viewers since the typical life of a cookie is a relatively short period. The categorization process is described by process 1440 of FIG. 14. In step S1406, for each unknown viewer/cookie their online behavior over time is recorded, and then this online behavior is processed relative to each categorization model to determine which demographic segments a particular viewer belongs to, and what the probability is that they belong to a particular segment associated with a particular model. For each unknown and uncharacterized viewer, the process continues until the viewer has been evaluated relative to each categorization model. Per step S1408, until the last categorization model is evaluated, the process proceeds to step S1410 where the probability that the viewer/cookie belongs to a categorization segment is recorded, followed by moving ahead to the next categorization model per step S1412. When the last categorization model has been evaluated for a particular viewer, the process proceeds to step S1414. If more viewers remain to be characterized, per step S1414 it is determined to proceed to S1416 and process the next unknown viewer/cookie for categorization relative to demographic segments. When per step S1414, it is determined that the last unknown and uncharacterized viewer has been processed and characterized, the process ends for the moment. When enough time has passed, due to the expiration of cookies it is eventually necessary to start process 1440 again in order to have enough characterized viewer inventory for online advertising campaigns.

Figure 15:
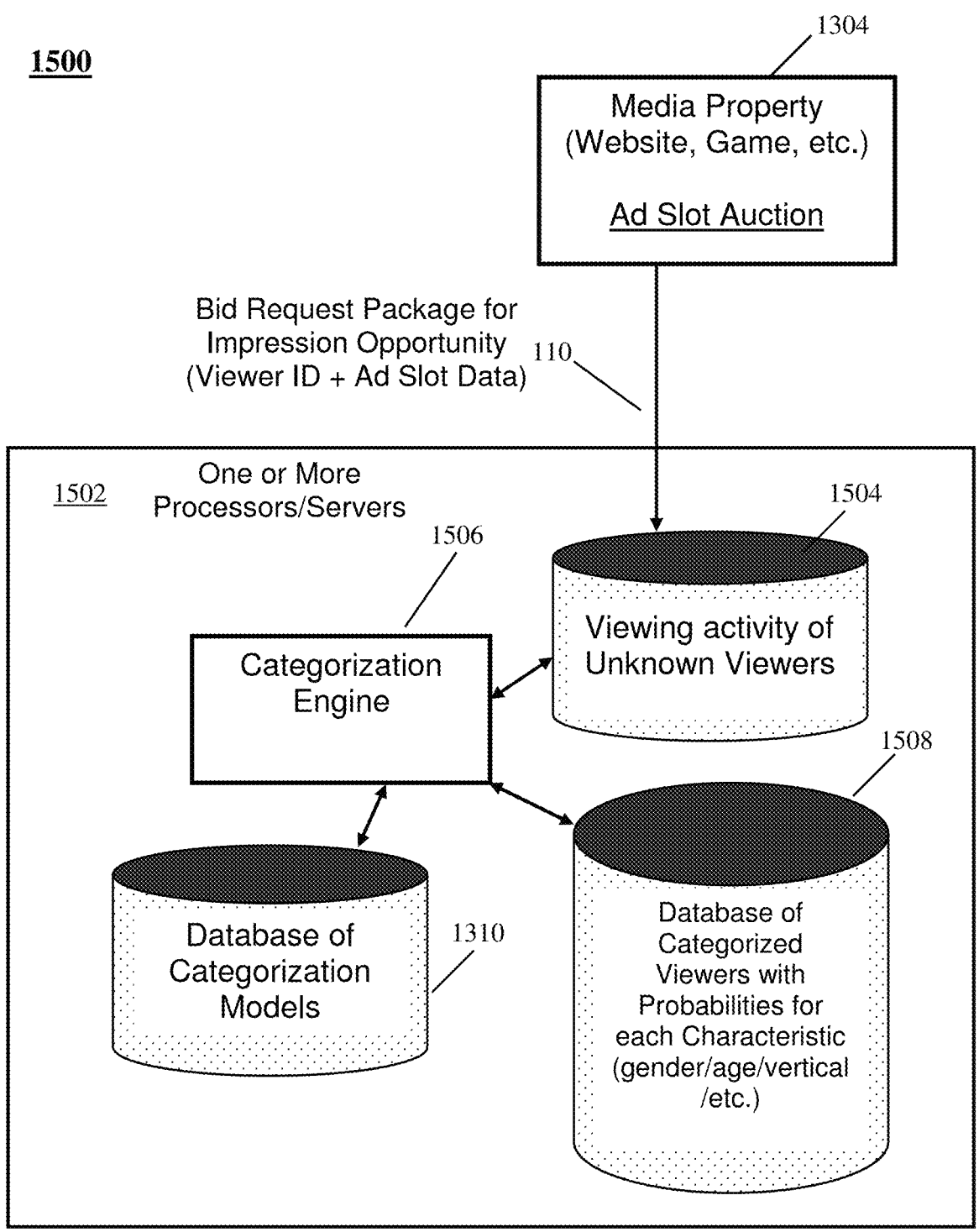
FIG. 15 shows a data flow diagram for an exemplary process where models created based on truth are used for categorizing unknown viewers to produce a database of categorized viewers including a probability that each individual viewer belongs to a particular categorization segment.

Data flow diagram 1500 includes process 1502 for categorizing unknown viewers and is shown in FIG. 15. Here, as bid request package 110 is supplied to a demand-side platform for possible bidding for an online ad slot on media property 1304, that MP is recorded for that viewer in a database 1504 containing viewing activity of unknown viewers who have yet to be characterized. After enough viewing activity has been accumulated for the viewer, categorization engine 1506 then processes a viewer's viewing activity with respect to a plurality of categorization models 1310 which were previously created by the process described with respect to FIG. 13 and process 1430 of FIG. 14. The categorization engine 1506 determines for each model a probability that a viewer belongs to a demographic segment targeted by that particular model. When process 1502 has been completed for all unknown viewers, database 1508 has been created containing all categorized viewers including the probabilities for each viewer relative to each demographic categorization segment that they may be a member of.

Using Viewer Categorization Probabilities in Bidding

Figure 16:
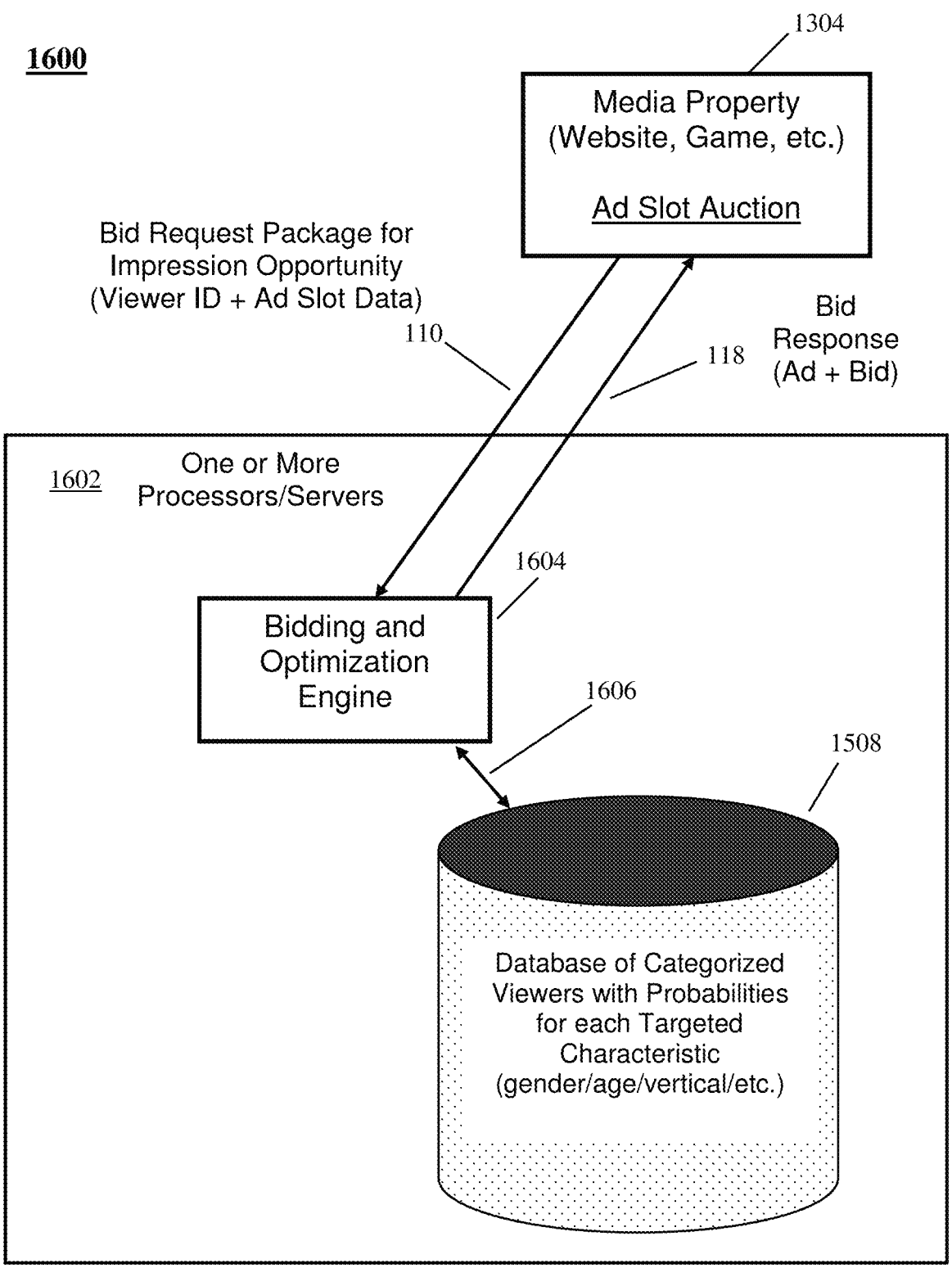
FIG. 16 shows a data flow diagram for an exemplary process where the database of categorized viewers, including probabilities that an individual viewer belongs to a particular categorization segment, is used in the bidding process to increase the probability that ads are delivered on target.

The modeling processes described herein based on machine learning enable viewers to be characterized more accurately relative to belonging to targeted demographic segments. This more accurate targeting is used in the bidding process for online ad opportunities in order to enable campaign budgets to be used more effectively. Data flow diagram 1600 of FIG. 16 describes data movement during the bidding process. A media property 1304 provides a bid request package 110 for an impression opportunity that includes a specific viewer's ID and data for the ad slot related to the opportunity. This is received within system 1602 according to the invention including one or more processors which implement a bidding and optimization engine 1604 which communicates 1606 with database 1508 containing information related to categorized viewers, including probabilities for each demographic characteristic related to each viewer. These characteristics may include not only gender and age bracket, but also behavioral segments and other categories as mentioned earlier. Based on the database of categorized viewers 1508 and other control inputs as well as control processes described herein, bidding engine 1604 supplies a bid response 118 to MP 1304.

Figure 17:
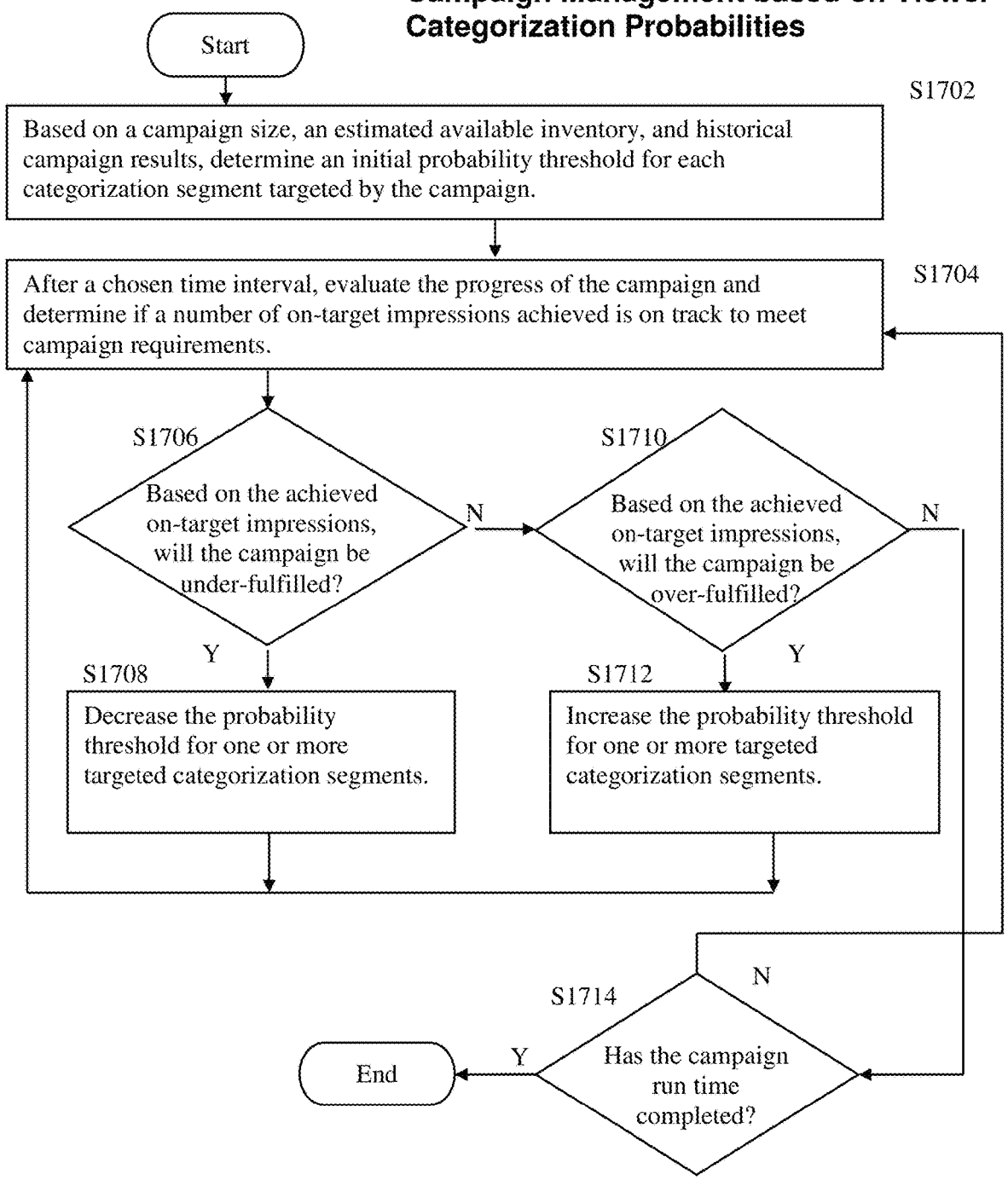
FIG. 17 shows a flow chart for an exemplary process where probabilities that viewers belong to particular demographic cauterization segments are used in the bidding process for an online advertisement auction.

An exemplary and non-limiting process for describing bidding functionality during an active advertising campaign is shown in flowchart 1700 of FIG. 17. A campaign may be operated with static thresholds relative to probabilities that a viewer belongs to certain demographic segments. This may suffice for some campaigns, however a campaign may be further optimized by adjusting probability threshold values dynamically during the execution of a campaign. If the campaign progress is not proceeding at a pace whereby the campaign will fulfill its impression targets by the end of the defined runtime, there are a number of options that may be pursued in dynamically managing the campaign. If more impression opportunities are needed per time, one option is to include unknown viewers who are visiting MPs where the MP has polarization characteristics in line with some of the campaign targeting guidelines. However, another option is to adjust probability threshold values for known and previously characterized viewers relative to certain demographic characteristics, or all demographic characteristics, in order to increase the number of impressions delivered by the end of the campaign. If the campaign is achieving on-target impressions at a rate higher than was anticipated in pre-campaign estimations and is therefore on target to over-fulfill the campaign during the prescribed runtime, the probability threshold value(s) may alternately be increased, thereby slowing the rate of impression fulfillment and at the same time increasing the targeting accuracy for the campaign.

A single probability threshold value can be determined and then applied to all demographic characteristics, or alternately, probability threshold values for some characteristics may be set higher or lower than for others. In step S1702 of FIG. 17, in an exemplary and non-limiting embodiment an initial probability threshold value is determined for each demographic categorization segment targeted by the campaign. For example, a particular advertiser may need to target a very specific and narrow age bracket, however at the same time may not be as concerned with the gender of a viewer, favoring females over males but by a small margin. In this case, the probability for the age bracket may be set to a higher value than the probability that the viewer is female. Also, different strategies are possible relative to responding to an impression opportunity, based on probabilities that the viewer belongs to various demographic segments. One decision may be to simply bid or not bid. Another decision may affect the actual amount to be bid in the auction for the impression opportunity. Thus, for some embodiments of the invention, for a single demographic characteristic a threshold determining whether to bid or not may comprise a first probability threshold value, while the determination of the actual bid amount may be based on a second probability threshold value.

In step S1704 after a time interval the progress of the campaign is evaluated and it is determined if the quantity of on-target impressions achieved to that time is on track to meet campaign requirements by the end of the campaign runtime. If per step S1706 it is determined that the campaign is on track to be under-fulfilled, then the probability threshold value for one or more targeted categorization segments may be decreased per step S1708. If however, per step S1710, based on the achieved on-target impressions to that point it is determined that the campaign is on target to be over-fulfilled, it may then be appropriate per step S1712 to increase the probability threshold value for one or more targeted campaign segments, thereby reducing the rate of impression fulfillment and at the same time increasing the targeting accuracy. Then, per steps S1706 and S1710 it is determined that the campaign is on track to be properly fulfilled in the specified runtime, and the process proceeds to step S1714 to determine if the runtime has completed. If so, then the process ends along with the campaign, and if not, the process returns to step S1704 to again determine how the campaign is progressing relative to the rate of fulfillment.

Using Viewer Categorization Probabilities in Estimating Campaign Results

Earlier in this specification and with respect to polarized viewers, it was disclosed that in predicting campaign results before execution of a campaign, a system operating according to the invention may examine targeted viewer characteristics for the campaign and estimate an amount of available inventory of polarized viewers in the database of polarized viewers that meet targeting criteria consistent with the targeted viewer characteristics. Then, based on the required campaign size—typically the total GRPs required in a specified campaign run time—a ratio of polarized viewers served to unknown viewers served is determined. This estimate was used in predicting campaign results prior to the start of campaign execution, and also used at times as an initial ratio of polarized viewers served to unknown viewers served at the beginning of campaign execution.

While the exemplary user interface of FIG. 8 allows a user to select different inventory tiers for inclusion in a campaign, a variation on this user interface in keeping with the teachings of FIGS. 9-11 herein would allow users to select different categories of polarized viewers for inclusion. Benefiting from the categorization models of FIGS. 13-15, and the resultant ability to create a large database of categorized viewers with probabilities of belonging to different demographic segments, an inventory of viewers with a probability of having certain characteristics above certain thresholds can be estimated. Also, the MPs visited by those viewers is recorded and used in targeting. Thus, an additional probabilistic capability per FIGS. 13-15 can be included in a user interface such as that shown in FIG. 8 to estimate results in terms of on-target-impressions and GRPs (Gross Rating Points) with more accuracy. Also, as described earlier for embodiments related to MP and viewer polarization, estimations constructed using database 1508 can be reconciled with $3^{rd}$ party data after the close of campaign to determine accuracy, and also to produce historical efficiency factors that may be used in future campaigns to enhance the accuracy of pre-campaign estimations.

Also, the same user controls offered to a user (client/advertiser) for estimation before a campaign can be used to drive bidding during a campaign. As mentioned earlier, the probability threshold value for determining bidding can be a single threshold value for all viewer demographic characteristics, or can be different threshold values for different viewer characteristics. If different, the user interface of FIG. 8 can be modified to add for example a set of slider bars, one for each viewer characteristic or demographic segment. The position of each slider represents a probability for the specific demographic characteristic. Then, the user can set the sliders to choose higher probability threshold values for characteristics that are most important to their campaign, and lower probability threshold values for characteristics that are less important to their campaign. The probability threshold values are used as initial probability threshold values, and can be maintained throughout a campaign, or alternately adjusted—raised or lowered—automatically during a campaign as described herein. These initial values can be set or pre-determined by either a client/advertiser, or by a demand-side platform on behalf of a client/advertiser. These probability threshold values can then be used to determine whether to bid of not, or to control bid price amounts. In yet another embodiment, a set of sliders or control inputs could be included in a user interface for determining whether or not to bid, and another set of sliders or control inputs could be included for determining bid prices. Further, in all of the above cases the parameters initially set by sliders or control inputs can be automatically adjusted during a campaign to either increase or decrease the rate of campaign fulfillment—the rate that on-target impressions are accomplished.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

At least certain principles of the invention can be implemented as hardware, firmware, software or any combination thereof. Moreover, the software is preferably implemented as an application program tangibly embodied on a program storage unit, a non-transitory user machine readable medium, or a non-transitory machine-readable storage medium that can be in a form of a digital circuit, an analog circuit, a magnetic medium, or combination thereof. The application program may be uploaded to, and executed by, a machine comprising any suitable architecture. Preferably, the machine is implemented on a user machine platform having hardware such as one or more central processing units ("CPUs"), a memory, and input/output interfaces. The user machine platform may also include an operating system and microinstruction code. The various processes and functions described herein may be either part of the microinstruction code or part of the application program, or any combination thereof, which may be executed by a CPU, whether or not such user machine or processor is explicitly shown. In addition, various other peripheral units may be connected to the user machine platform such as an additional data storage unit and a printing unit.

What is claimed is:

1. A computerized method comprising:
    establishing a database of polarization profiles for a plurality of media properties, wherein the polarization profiles of the plurality of media properties comprise a plurality of polarization ratings corresponding to the plurality of media properties and reflecting a plurality of probabilities that the plurality of media properties comprise polarized viewers;
    generating a truth set of viewers from online interactions of a plurality of computing devices by:
        assigning a default probability that a truth viewer of the truth set of viewers belongs to a categorization segment;
        identifying, from online behavior of the truth viewer, a media property of the plurality of media properties; and
        determining a ground-truth categorization for the truth viewer based on a probability that the truth viewer belongs to a categorization segment, wherein the probability is based on combining the polarization ratings of the media property and the default probability;
    generating signatures for the truth set of viewers by identifying online interactions of the truth set of viewers;
    training a machine learning categorization model utilizing the signatures by predicting one or more categorization segments for the truth set of viewers and comparing the one or more predicted categorization segments to the ground-truth categorization;
    identifying an impression opportunity from a remote server for a specific viewer in an online media auction;
    applying the machine learning categorization model to a signature corresponding to the specific viewer to determine one or more categorization segments for the specific viewer; and
    providing, based on the determined one or more categorization segments for the specific viewer, a bid in response to the impression opportunity for the specific viewer in the online media auction.

2. The computerized method of claim 1, wherein generating the bid further comprises:
    utilizing the machine learning categorization model to determine probabilities that the specific viewer belongs to the one or more categorization segments for the specific viewer; and
    comparing the probabilities with a pre-determined probability threshold value.

3. The computerized method of claim 1, wherein establishing the database of polarization profiles for the plurality of media properties further comprises:
    determining a gain factor for a polarized viewer group and for a media property of the plurality of media properties based on activity of a least frequent viewer class relative to a number of known members of the viewer group; and
    wherein a polarization rating of the plurality of polarization ratings for the polarized viewer group and for the media property is based at least in part on the determined gain factor.

4. The computerized method of claim 3, wherein the polarization rating is further based on a product of:
    the determined gain factor; and
    a ratio of known viewers from the polarized viewer group for a media property and a total number of viewers for the media property.

5. The computerized method of claim 2, further comprising:
    providing the bid in response to determining that the specific viewer is a member of a categorization segment targeted by an online media campaign;
    determining that the online media campaign is on target to under-fulfill the media campaign; and
    automatically lowering the probability threshold value such that a larger number of impression opportunities are bid for.

6. The computerized method of claim 5, further comprising:
    determining that a campaign is on target to under-fulfill the media campaign;
    determining that lowering the probability threshold value for the determination to bid has not brought campaign progress in line with fulfilling the media campaign; and
    bidding on impression opportunities for unknown viewers visiting Media Properties having polarization characteristics consistent with demographic characteristics targeted by the campaign.

7. The computerized method of claim 2, further comprising:
    providing the bid in response to determining that the specific viewer is a member of a categorization segment targeted by an online media campaign; determining that the campaign is on target to over-fulfill the media campaign; and
    automatically raising the probability threshold value such that a smaller number of impression opportunities are bid for.

8. The computerized method of claim 5, wherein generating the bid further comprises setting a first probability threshold value for a first categorization segment and a second probability threshold value for a second categorization segment.

9. The computerized method of claim 8, further comprising utilizing a user interface to set the first probability threshold value and the second probability threshold value.

10. The computerized method of claim 1, wherein generating the signatures for the truth set of viewers further comprises generating a compilation of media properties accessed by devices of the truth set of viewers.

11. The computerized method of claim 8 wherein if the campaign is on target to over-fulfill the media campaign, the first and second probability threshold values are automatically raised such that a smaller number of impression opportunities per time are bid for.

12. The computerized method of claim 8 wherein if the campaign is on target to under-fulfill the media campaign, the first and second probability threshold values are automatically lowered such that a larger number of impression opportunities per time are bid for.

13. A system comprising:
    at least one processor, and
    at least one non-transitory computer readable storage medium storing instructions thereon that, when executed by the at least one processor, cause the system to:
        establish a database of polarization profiles for a plurality of media properties, wherein the polarization profiles of the plurality of media properties comprise a plurality of polarization ratings corresponding to the plurality of media properties and reflecting a plurality of probabilities that the plurality of media properties comprise polarized viewers;

generate a truth set of viewers from online interactions of a plurality of computing devices by:
assigning a default probability that a truth viewer of the truth set of viewers belongs to a categorization segment;
identifying, from online behavior of the truth viewer, a media property of the plurality of media properties; and
determining a ground-truth categorization for the truth viewer based on a probability that the truth viewer belongs to a categorization segment, wherein the probability is based on combining the polarization ratings of the media property and the default probability;
generate signatures for the truth set of viewers by identifying online interactions of the truth set of viewers;
train a machine learning categorization model utilizing the signatures by predicting one or more categorization segments for the truth set of viewers and comparing the predicted one or more categorization segments to the ground-truth categorization;
identify an impression opportunity from a remote server for a specific viewer in an online media auction;
apply the machine learning categorization model to a signature corresponding to the specific viewer to determine one or more categorization segments for the specific viewer; and
provide, based on the determined one or more categorization segments for the specific viewer, a bid in response to the impression opportunity for the specific viewer in the online media auction.

14. The system of claim 13, further comprising instructions that, when executed by the at least one processor, further cause the system to:
utilize the machine learning categorization model to determine probabilities that the specific viewer belongs to the one or more categorization segments for the specific viewer; and
determine, by a demand-side platform, a relationship between a bid price and the probabilities that the specific viewer belongs to the one or more categorization segments for the specific viewer.

15. The system of claim 14, further comprising instructions that, when executed by the at least one processor, further cause the system to:
receive, from a client/advertiser, a relationship between a bid price and the probabilities that the specific viewer belongs to the one or more categorization segments for the specific viewer; and
provide the bid comprising the bid price to in response to the impression opportunity.

16. The system of claim 13, wherein the machine learning categorization model comprises a neural network.

17. The system of claim 16, further comprising instructions that, when executed by the at least one processor, further cause the system to:
determine a media campaign is on target to under-fulfill the media campaign;
determine that adjusting a probability threshold to increase a bid price has not brought campaign progress in line with fulfilling the media campaign; and
bid on impression opportunities for unknown viewers visiting Media Properties having polarization characteristics consistent with demographic characteristics targeted by the campaign.

18. The system of claim 13, further comprising instructions that, when executed by the at least one processor, further cause the system to:
provide the bid in response to determining that the specific viewer is a member of a categorization segment targeted by an online media campaign; determine that the campaign is on target to over-fulfill the media campaign; and
adjust a probability threshold such that a bid price for impressions is automatically decreased.

19. The system of claim 16, wherein generating the bid further comprises setting a first probability threshold value for a first categorization segment and a second probability threshold value for a second categorization segment.

20. The system of claim 19, further comprising instructions that, when executed by the at least one processor, further cause the system to utilize a user interface to set the first probability threshold value and second probability threshold value.

21. The system of claim 20, wherein setting the first probability threshold value and the second probability threshold value further comprises adjusting first and second slider bars on the user interface.

22. The system of claim 19, further comprising instructions that, when executed by the at least one processor, further cause the system to:
determine that the media campaign is on target to over-fulfill the media campaign; and
automatically adjusting the first probability threshold value and the second probability threshold value such that a smaller number of impression opportunities per time are bid for.

23. The system of claim 19, further comprising instructions that, when executed by the at least one processor, further cause the system to:
determine that the media campaign is on target to under-fulfill the media campaign; and
automatically adjusting the first probability threshold value and the second probability threshold value such that a larger number of impression opportunities per time are bid for.

24. A non-transitory computer readable medium comprising instructions that, when executed by at least one processor, cause a computer system to:
establish a database of polarization profiles for a plurality of media properties, wherein the polarization profiles of the plurality of media properties comprise a plurality of polarization ratings corresponding to the plurality of media properties and reflecting a plurality of probabilities that the plurality of media properties comprise polarized viewers;
generate a truth set of viewers from online interactions of a plurality of computing devices by:
assigning a default probability that a truth viewer of the truth set of viewers belongs to a categorization segment;
identifying, from online behavior of the truth viewer, a media property of the plurality of media properties; and
determining a ground-truth categorization for the truth viewer based on a probability that the truth viewer belongs to a categorization segment, wherein the probability is based on combining the polarization ratings of the media property and the default probability;
generate signatures for the truth set of viewers by identifying online interactions of the truth set of viewers;

train a machine learning categorization model utilizing the signatures by predicting one or more categorization segments for the truth set of viewers and comparing the predicted one or more categorization segments to the ground-truth categorization;

identify an impression opportunity from a remote server for a specific viewer in an online media auction;

apply the machine learning categorization model to a signature corresponding to the specific viewer to determine one or more categorization segments for the specific viewer; and provide, based on the determined one or more categorization segments for the specific viewer, a bid in response to the impression opportunity for the specific viewer in the online media auction.

25. The non-transitory computer readable medium of claim 24, further comprising instructions that, when executed by the at least one processor, further cause the computer system to:

utilize the machine learning categorization model to determine probabilities that the specific viewer belongs to the one or more categorization segments for the specific viewer; and determine, by a demand-side platform, a relationship between a bid price and the probabilities that the specific viewer belongs to the one or more categorization segments for the specific viewer.

26. The non-transitory computer readable medium of claim 25, further comprising instructions that, when executed by the at least one processor, further cause the computer system to receive, from a client/advertiser, a relationship between a bid price and the probabilities that the specific viewer belongs to the one or more categorization segments for the specific viewer; and provide the bid comprising the bid price in response to the impression opportunity.

27. The non-transitory computer readable medium of claim 24, wherein the machine learning categorization model comprises at least one of a neural network, a decision tree, a support vector machine, or a Bayesian technique.

* * * * *